United States Patent
Adragna et al.

(10) Patent No.: US 11,452,184 B1
(45) Date of Patent: Sep. 20, 2022

(54) AVERAGE CURRENT CONTROL CIRCUIT AND METHOD

(71) Applicant: STMicroelectronics S.r.l., Agrate Brianza (IT)

(72) Inventors: Claudio Adragna, Monza (IT); Giovanni Gritti, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/487,944

(22) Filed: Sep. 28, 2021

(51) Int. Cl.
*H05B 45/10* (2020.01)
*H02M 1/42* (2007.01)
*H05B 45/385* (2020.01)

(52) U.S. Cl.
CPC .......... *H05B 45/10* (2020.01); *H02M 1/4225* (2013.01); *H02M 1/4258* (2013.01); *H05B 45/385* (2020.01)

(58) Field of Classification Search
CPC ..... Y02B 70/10; Y02B 20/30; H02M 1/4225; H02M 3/33507; H02M 1/0058; H02M 1/0009; H02M 1/0025; H02M 1/08; H02M 1/4258; H02M 3/156; H02M 3/33523; H02M 1/0022; H02M 1/12; H02M 1/42; H02M 3/157; H02M 1/0016; H02M 1/0048; H02M 1/0064; H02M 1/36; H02M 1/4241; H02M 3/335; H02M 3/33515; H02M 7/06; H02M 1/0032; H02M 1/0054; H02M 1/007; H02M 1/083; H02M 1/15; H02M 1/32; H02M 1/4208; H02M 3/1582; H02M 3/1584; H02M 3/315; H05B 45/385; H05B 45/10; H05B 45/37; H05B 47/10
See application file for complete search history.

(56) References Cited

U.S. PATENT DOCUMENTS

| | | |
|---|---|---|
| 6,842,353 B2 | 1/2005 | Yamada et al. |
| 7,042,743 B2 | 5/2006 | Pidutti et al. |
| 7,848,126 B2 | 12/2010 | Hartlieb et al. |

(Continued)

OTHER PUBLICATIONS

Adragna, Claudio, "Design-Oriented Small-Signal Modeling of Primary-Side Regulated Flyback Converters," Power Conversion Applications Laboratory, STMicroelectronics s.r.l., 2018, 8 pages.

(Continued)

*Primary Examiner* — Monica C King
(74) *Attorney, Agent, or Firm* — Slater Matsil, LLP

(57) ABSTRACT

A control circuit includes: a flip-flop having an output configured to be coupled to a control terminal of a transistor and for producing a first signal; a comparator having an output coupled to an input of the flip-flop, and first and second inputs for receiving first and second voltages, respectively; a transconductance amplifier having an input for receiving a sense voltage indicative of a current flowing through the transistor, and an output coupled to the first input of the comparator; a zero crossing detection (ZCD) circuit having an input configured to be coupled to a first current path terminal of the transistor and to an inductor, where the ZCD circuit is configured to detect a demagnetization time of the inductor and produce a third signal based on the detected demagnetization time; and a reference generator configured to generate the second voltage based on the first and third signals.

25 Claims, 15 Drawing Sheets

(56) References Cited

U.S. PATENT DOCUMENTS

| | | |
|---|---|---|
| 8,194,420 B2 | 6/2012 | Tumminaro et al. |
| 8,270,190 B2 | 9/2012 | Adragna |
| 8,305,004 B2 | 11/2012 | Shao |
| 8,467,209 B2 | 6/2013 | Adragna |
| 9,018,855 B2 | 4/2015 | Chen |
| 9,042,127 B2 | 5/2015 | Gong |
| 9,271,366 B2 | 2/2016 | Yu et al. |
| 9,423,808 B2 | 8/2016 | Tateishi et al. |
| 9,660,542 B2 | 5/2017 | Schaemann et al. |
| 9,699,838 B2 | 7/2017 | Xu |
| 9,699,840 B2 | 7/2017 | Xu et al. |
| 9,755,511 B2 | 9/2017 | Lee et al. |
| 9,800,148 B2 | 10/2017 | Gritti et al. |
| 9,913,329 B2 | 3/2018 | Gritti |
| 10,128,761 B2 | 11/2018 | Gritti et al. |
| 10,236,774 B2 | 3/2019 | Gritti |
| 10,241,322 B2 | 3/2019 | Gritti et al. |
| 10,284,096 B2 | 5/2019 | Gritti |
| 10,298,116 B2 | 5/2019 | Gritti et al. |
| 10,461,658 B2 | 10/2019 | Adragna |
| 11,005,361 B2 | 5/2021 | Scappatura et al. |
| 11,374,483 B2* | 6/2022 | Kazama ............... H02M 1/08 |
| 11,374,484 B2* | 6/2022 | Liang ............... H02M 3/158 |
| 2008/0180075 A1 | 7/2008 | Xie et al. |
| 2008/0259656 A1 | 10/2008 | Grant |
| 2009/0086513 A1 | 4/2009 | Lombardo et al. |
| 2009/0316454 A1* | 12/2009 | Colbeck ............ H02M 3/3376 363/89 |
| 2010/0321956 A1 | 12/2010 | Yeh |
| 2011/0018516 A1* | 1/2011 | Notman ............ H02M 3/1588 323/284 |
| 2012/0026765 A1 | 2/2012 | Adragna |
| 2012/0026766 A1 | 2/2012 | Adragna |
| 2014/0029316 A1 | 1/2014 | Adragna |
| 2014/0097808 A1 | 4/2014 | Clark et al. |
| 2016/0172981 A1 | 6/2016 | Gritti et al. |
| 2016/0248323 A1 | 8/2016 | Gritti et al. |
| 2016/0261199 A1 | 9/2016 | Adragna et al. |
| 2016/0336861 A1 | 11/2016 | Gritti |
| 2017/0019030 A1 | 1/2017 | Sugawara |
| 2018/0375434 A1* | 12/2018 | Biziitu ............... H02M 3/156 |
| 2020/0144923 A1 | 5/2020 | Cohen |
| 2020/0158766 A1* | 5/2020 | Nate ................. G01R 19/175 |
| 2020/0321855 A1 | 10/2020 | Gritti |
| 2021/0099073 A1* | 4/2021 | Hrinya ............... H02M 1/32 |
| 2021/0105875 A1 | 4/2021 | Lyu |
| 2022/0034946 A1* | 2/2022 | Nate ................. G01R 19/175 |

OTHER PUBLICATIONS

Hwu, Kuo-Ing et al., "Light-Emitting Diode Driver with Low-Frequency Ripple Suppressed and Dimming Efficiency Improved," IET Power Electron., vol. 7, Iss. 1, 2014, 9 pages.

Jane, Gwan-Chi et al., "Dimmable Light-Emitting Diode Driver with Cascaded Current Regulator and Voltage Source," IET Power Electronics, vol. 8, Iss. 7, Mar. 4, 2015, 7 pages.

SGS-Thomson Microelectronics, "UC3842 Provides Low-Cost Current-Mode Control," Application Note, 1995, 16 pages.

Shao, Jianwen, "Single Stage Offline LED Driver," STMicroelectronics, 2009, 5 pages.

Stmicroelectronics, "Off-Line All-Primary-Sensing Switching Regulator," ALTAIR04-900, DocID18211 Rev 3, Oct. 2014, 29 pages.

Wu, Stockton, "Single-Stage High Power Factor Flyback for LED Lighting," Richtek, AN012, May 2014, 13 pages.

* cited by examiner

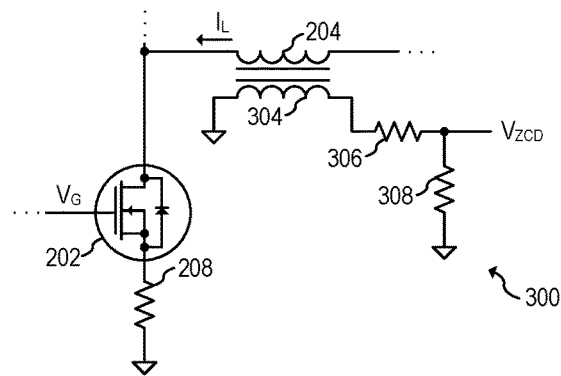
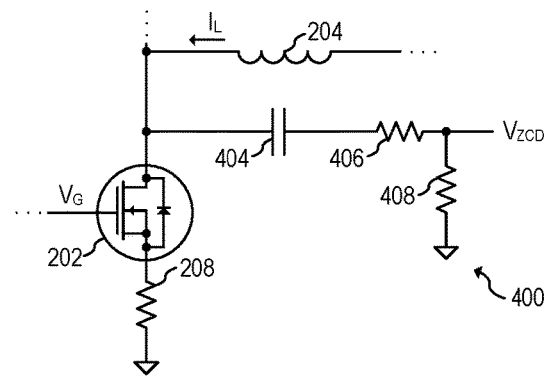
FIG. 3
FIG. 4
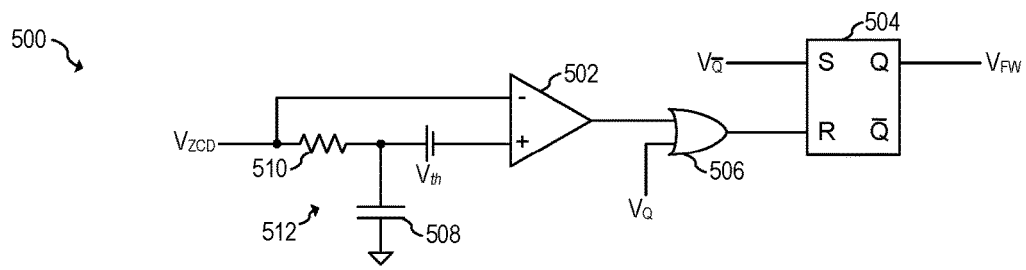
FIG. 5
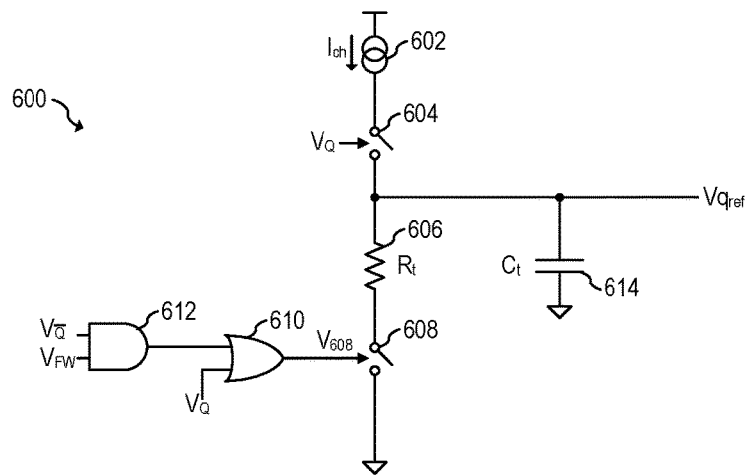
FIG. 6

AVERAGE CURRENT CONTROL CIRCUIT AND METHOD

CROSS-REFERENCE TO RELATED APPLICATIONS

This application is related to co-pending U.S. patent application Ser. No. 17/487,999, filed on the same day as this application, entitled "Average Current Control Circuit and Method,", and to co-pending U.S. patent application Ser. No. 17/487,966, filed on the same day as this application, entitled "QR-Operated Switching Converter Current Driver, ", which applications are hereby incorporated herein by reference.

TECHNICAL FIELD

The present disclosure relates generally to an electronic system and method, and, in particular embodiments, to an average current control circuit and method.

BACKGROUND

A light emitting diode (LED) driver is configured to provide sufficient current to light the LED. A switching voltage regulator may be used to drive a LED.

The intensity of light produced by the LED is related to the average current flowing through the LED. Generally, the higher the average current flowing through the LED, the higher the intensity of light produced by the LED. Thus, it is generally desirable to use a current driver for driving the LED, to accurately control the average current flowing through the LED.

Dimming of a LED is possible by controlling the average current flowing through the LED. For example, reducing the intensity of light produced by the LED may be achieved by reducing the average current flowing through the LED.

Fluctuations in the average current flowing through the LED may cause fluctuations in the light emitted by the LED. Thus, a switching converter current driver may be used to properly drive a LED by switching at a frequency higher than the flicker fusion threshold.

LED lamp drivers are often specified for a rated output current (sometimes programmable in a range by a user) and for a range of output voltages to power different types/ lengths of LED string. Notably, the rated output current is normally specified with quite tight accuracy, often less than 5% overall.

It is also common for LED lamp drivers to provide dimming capability, i.e., the ability to reduce the LED current from the rated value down to low values (sometimes lower than 1%) to enable the user to lower the intensity of the light output of the LED string. It is generally desirable for the LED current reduction and the resulting light modulation to be seamless and flicker-free.

SUMMARY

In accordance with an embodiment, a control circuit includes: a driver having an output configured to be coupled to a control terminal of a first transistor; a first flip-flop having a first output coupled to an input of the driver, and a first input configured to receive a clock signal, where the first flip-flop is configured to produce a first signal at the first output of the first flip-flop; a first comparator having an output coupled to a second input of the first flip-flop, a first input configured to receive a first voltage, and a second input configured to receive a second voltage; a transconductance amplifier having a first input configured to receive a sense voltage indicative of a current flowing through a current path of the first transistor, a second input configured to receive a reference voltage, and an output coupled to the first input of the first comparator; a integrating capacitor coupled to the output of the transconductance amplifier and to the first input of the first comparator; a first switch coupled across the integrating capacitor, the first switch having a control terminal configured to receive a second signal, the second signal being an inverted version of the first signal; a zero crossing detection circuit having an input configured to be coupled to a first current path terminal of the first transistor and to an inductor, where the zero crossing detection circuit is configured to detect a demagnetization time of the inductor based on the input of the zero crossing detection circuit, and produce a third signal based on the detected demagnetization time; and a reference generator configured to generate the second voltage based on the first and third signals.

In accordance with an embodiment, a method includes: turning on a first transistor based on a clock signal, where a current path of the first transistor is coupled to an inductor; generating a sense current based on a current flowing through the current path of the first transistor; integrating the sense current with an integrating capacitor to generate a first voltage; injecting a first current into an averaging capacitor to generate a second voltage; turning off the first transistor when the first voltage becomes higher than the second voltage; and discharging the integrating capacitor when the first transistor turns off.

In accordance with an embodiment, a switching converter includes: a power transistor; a sense resistor coupled to a current path of the power transistor; an inductor coupled to the current path of the power transistor; a driver having an output coupled to a control terminal of the power transistor; a flip-flop having a first output coupled to an input of the driver, and a first input configured to receive a clock signal, where the flip-flop is configured to produce a first signal at the first output of the flip-flop, and where the flip-flop is configured to cause the power transistor to turn on using the first signal based on the clock signal; a first comparator having an output coupled to a second input of the flip-flop, a first input configured to receive a first voltage, and a second input configured to receive a second voltage, where the flip-flop is configured to cause the power transistor to turn off using the first signal based on the output of the first comparator; a transconductance amplifier having a first input coupled to an intermediate node that is coupled between the current path of the power transistor and the sense resistor, a second input configured to receive a reference voltage, and an output coupled to the first input of the first comparator; an integrating capacitor coupled to the output of the transconductance amplifier and to the first input of the first comparator; a first switch coupled to the integrating capacitor, the first switch configured to discharge the integrating capacitor when the power transistor turns off; a zero crossing detection circuit having an input coupled to the current path of the power transistor and to the inductor, where the zero crossing detection circuit is configured to detect a demagnetization time of the inductor based on the input of the zero crossing detection circuit, and produce a second signal based on the detected demagnetization time; and a reference generator configured to generate the first voltage based on the first and second signals.

In accordance with an embodiment, a light emitting diode (LED) lamp driver includes: an output terminal configured to be coupled to a LED string; a first switching converter configured to receive an AC voltage and generate a DC voltage, at a first supply terminal, from the AC voltage; and a second switching converter configured to receive the DC voltage and deliver a regulated current to the LED string, the second switching converter including: a power transistor, a sense resistor coupled to a current path of the power transistor, an inductor coupled to the current path of the power transistor and to the output terminal, a diode coupled between the inductor and the first supply terminal, a flip-flop having a first output coupled to a control terminal of the power transistor, and a first input configured to receive a clock signal, where the flip-flop is configured to produce a first signal at the first output of the flip-flop, and where the flip-flop is configured to cause the power transistor to turn on using the first signal based on the clock signal, a first comparator having an output coupled to a second input of the flip-flop, a first input configured to receive a first voltage, and a second input configured to receive a second voltage, where the flip-flop is configured to cause the power transistor to turn off using the first signal based on the output of the first comparator, a transconductance amplifier having a first input coupled to an intermediate node that is coupled between the current path of the power transistor and the sense resistor, a second input coupled to a second supply terminal, and an output coupled to the first input of the first comparator; an integrating capacitor coupled to the output of the transconductance amplifier and to the first input of the first comparator, a first switch coupled to the integrating capacitor, the first switch configured to discharge the integrating capacitor when the power transistor turns off, a zero crossing detection circuit having an input coupled to the current path of the power transistor and to the inductor, where the zero crossing detection circuit is configured to detect a demagnetization time of the inductor based on the input of the zero crossing detection circuit, and produce a second signal based on the detected demagnetization time; and a reference generator configured to generate the first voltage based on the first and second signals.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3 and 4 shows schematic diagrams of interface (I/F) circuits of FIG. 2, according to embodiments of the present invention;

FIG. 5 shows a schematic diagram of a zero-crossing detection (ZCD) circuit, according to an embodiment of the present invention;

FIG. 6 shows a reference generator, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a current switching converter (constant current source) LED driver, e.g., for use in solid-state lighting (SSL), such as for driving one or more LEDs as the load. In some embodiments, the load may not include a LED. Some embodiments may be implemented in applications different from SSL, such as industrial, consumer, ICT, white goods, etc., "as is," or with small adaptations. Some embodiments may be used in a voltage switching converter.

In an embodiment of the present invention, the average inductor current of a continuous conduction mode (CCM)-operated buck converter is regulated by sensing only the current flowing through a power transistor. Some embodiments are based on a charge-mode control core that enables stable CCM operation with a fixed or quasi-fixed switching frequency. In some embodiments, a zero current detection (ZCD) circuit enables discontinuous conduction mode (DCM) operation with a nominally unaltered control scheme, which advantageously allows for good accuracy of output current regulation during analog dimming. In some embodiments, a voltage feedforward circuit compensates propagation delays making the regulated output current little sensitive to input and output voltage variations.

Figure 1:
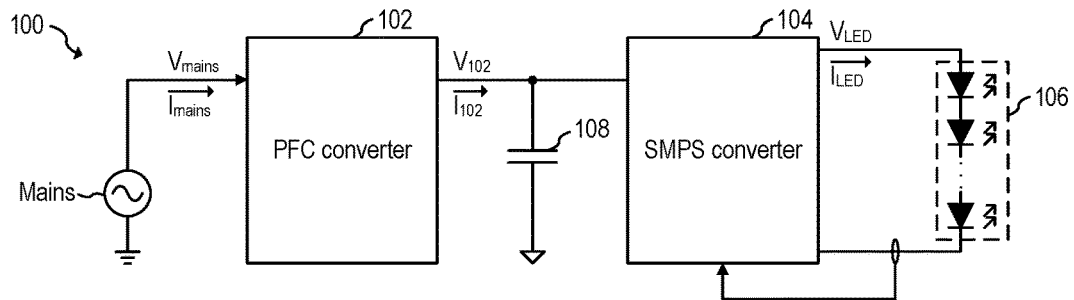
FIG. 1 shows a LED lamp driver, according to an embodiment of the present invention.

FIG. 1 shows LED lamp driver 100, according to an embodiment of the present invention. LED lamp driver 100 includes switched-mode power supply (SMPS) 102, and SMPS 104 for driving LED string 106. Switching converter 102 provides a regulated DC output voltage $V_{102}$ across energy storage capacitor 108 that supplies power to cascaded converter 104. Converter 104 provides a regulated output current that powers LED string 106.

In some embodiments, switching converter 102 may be implemented as a power factor corrector (PFC) front-end converter, which may draw a sinusoidal current $I_{mains}$ from the power line, in-phase with the sinusoidal line voltage $V_{mains}$ (e.g., 60 Hz, 110 $V_{rms}$; 50 Hz, 220 $V_{rms}$) may be used. Using a PFC front-end converter may advantageously achieve high power factor and low distortion of the input current. In some embodiments, using implementing switching converter 102 with PFC may advantageously help keep harmonic emissions low, which may advantageously help comply with standards such as the IEC61000-3-2, which sets class C harmonic emission limits for applications such as LED lamp drivers. In some embodiments, implementing converter 102 with PFC advantageously help keep total harmonic distortion (THD) of the input current $I_{mains}$ low.

AC/DC switching converter 102 may introduce ripple in the output current $I_{102}$. For example, current $I_{102}$ may exhibit a ripple with a high frequency component at the switching frequency of converter 102 (typically above 50 kHz), and a low-frequency component at twice the frequency of the AC power line (due to the pulsating nature of the power converter 102 draws from the power line and deliver to its output). The low-frequency ripple, if provided to LED string 106, may cause a reduction of the average LED current $I_{LED}$ for a given peak value, and may cause an increase in the operating temperature of the LEDs of LED string 106, which may shorten the lifetime of the LEDs of LED string 106. Such low-frequency ripple may also cause light fluctuations (flicker and shimmer), which may be undesirable if perceptible, and which have been reported to cause health problems even when imperceptible.

The PFC output voltage $V_{102}$ may be affected by a low-frequency ripple, generated by the low-frequency component of the output current $I_{102}$ ripple. Generally, converter 102 regulates the DC value of the output voltage $V_{102}$ by a low-bandwidth control loop to achieve high power factor and low distortion of the input current, but may be unable to reject the low-frequency output ripple.

In some embodiments, using a two-stage power conversion, such as shown in FIG. 1 (with front-end PFC converter 102 supply power to capacitor 108, and a cascaded post-regulator converter 104 supplying a regulated current to LED string 106) advantageously help prevent LED string 106 from being exposed to the ripple at the output of PFC converter 102. For example, in some embodiments, converter 104 provides a DC constant current $I_{LED}$, regulated by a wide-bandwidth control loop able to reject the low-frequency input voltage ripple, which advantageously optimizes the usage of LED string 106 and provides flicker-free operation of LED string 106.

In some embodiments, converter 102 may be implemented as a boost converter and converter 104 may be implemented as a buck converter. For example, in some embodiments delivering less than 100 W of power to LED string 106, voltage $V_{102}$ may be, e.g., between 100 V and 400 V, and converter 104 provides voltage $V_{LED}$ at a level that is appropriate for LED string 106, such as between 30 V and 60 V. In some embodiments, implementing converter 102 as a boost and converter 104 as a buck may advantageously keep current $I_{102}$ (and the relevant low-frequency ripple) low and may advantageously allow for implementing capacitor 108 without using a bulky, large value energy storage capacitor. Implementing converter 102 and 104 as a boost and buck converters, respectively, may also advantageously help in complying with safety extra low voltage (SELV) requirements, which limits $V_{LED}$ to 60 V.

In some embodiments, converter 102 may be implemented as a flyback converter, which may advantageously provide isolation from mains. Isolation from mains may advantageously help comply with electrical safety standards, such as IEC60950, IEC62368, IEC61347-1, for example.

Figure 2:
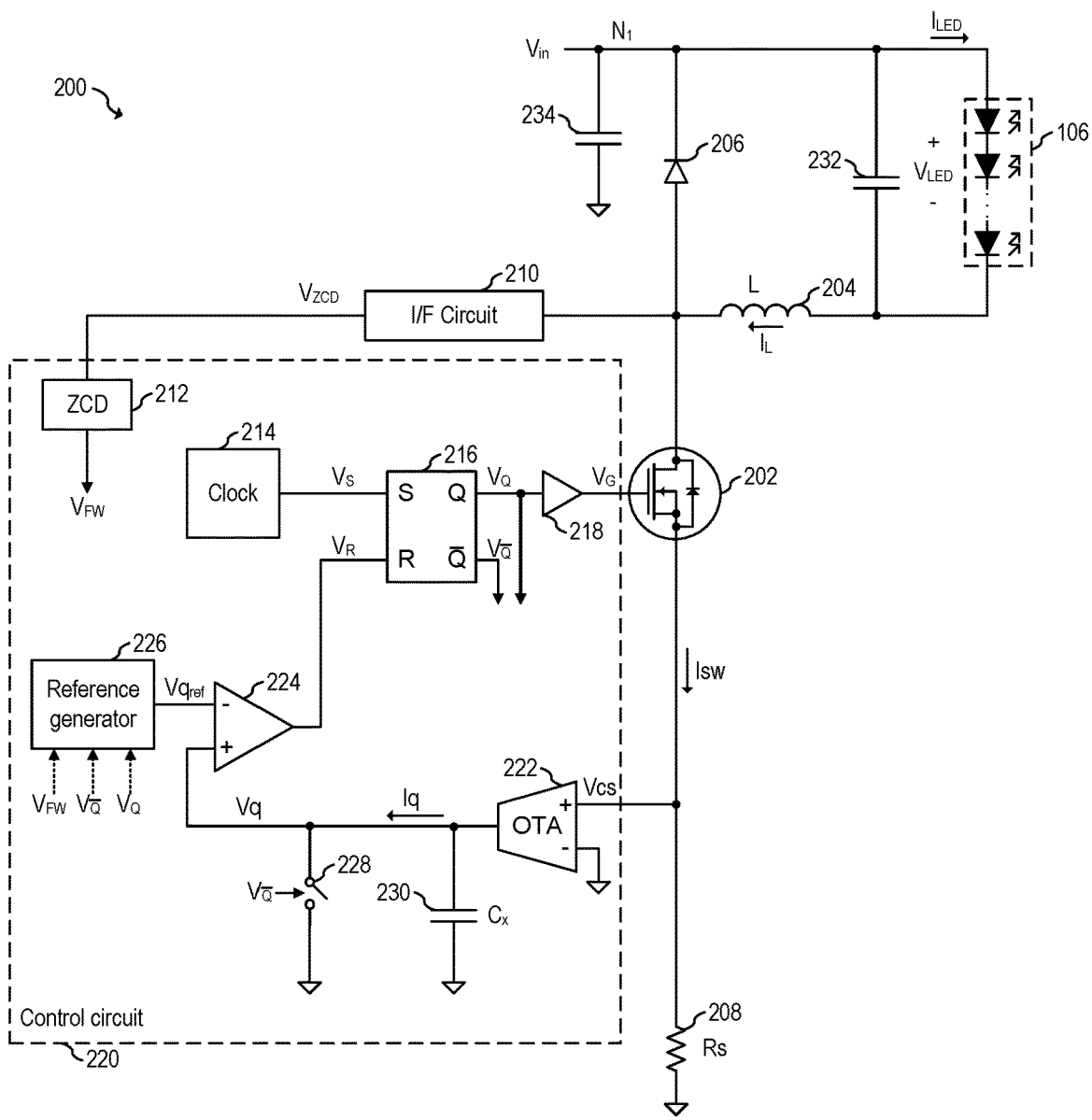
FIG. 2 shows a schematic diagram of a buck converter, according to an embodiment of the present invention.

FIG. 2 shows a schematic diagram of buck converter 200, according to an embodiment of the present invention. Buck converter 200 includes power transistor 202, interface (I/F) circuit 210, sense resistor 208, inductor 204, and control circuit 220. Control circuit 220 includes gate driver 218, zero-current detection (ZCD) circuit 212, flip-flop 216, clock circuit 214, transconductance amplifier (OTA) 222, capacitor 230, switch 228, comparator 224, and reference generator 226. SMPS 104 may be implemented as buck converter 200 (e.g., where node $N_1$ receives voltage $V_{102}$ as $V_{in}$).

Although LED string 106 is shown as the load driven by buck converter 200, in some embodiments, other loads, instead of or in addition to a LED string, may be driven by buck converter 200. For example, in some embodiments, load 106 may be a rechargeable battery.

As shown in FIG. 2, in some embodiments, power transistor 202 has a source terminal connected to ground, freewheeling diode 206 is connected to node $N_1$, and the load 106 is appended to node $N_1$ in series with inductor 204. Such configuration may advantageously allow for easier driving of transistor 202 compared to driving a floating power switch and allow for having control circuit 220 referred to ground, which may advantageously allow for simplified interfacing with lamp controls such as remote on/off, diming circuits, etc.

Converter 202 may be operated in continuous conduction mode (CCM). Operating converter 202 in CCM mode advantageously allow for a lower capacitance of output capacitor 232. Using a lower capacitance may advantageously allow for using ceramic capacitors instead of electrolytic capacitors, which may advantageously result in higher reliability and lower lifetime of converter 202. In some embodiments, output capacitor 232 may be omitted.

Converter 202 may be operated in discontinuous conduction mode (DCM), which may advantageously allow for good accuracy of current $I_{LED}$ at light loads (e.g., during analog diming). As will be described in more detail later, in some embodiments, ZCD circuit 212 enables DCM operation with a nominally unaltered control scheme (e.g., as given by Equation 11).

During normal operation (e.g., in CCM or DCM mode), power transistor 202 is turned on when pulses delivered by clock 214 set flip-flop 216. Power transistor 202 is turned off when flip-flop 216 is reset by comparator 224, which trips when voltage Vq is equal to voltage $Vq_{ref}$. In some embodiments, the pulses delivered by clock 214 have a fixed switching period $T_S$.

The current $I_{LED}$ delivered to LED string 106 is the average value of the inductor current $I_L(t)$ regardless of the operating mode. The portion Isw(t) of the inductor current $I_L(t)$ flowing through power transistor 202 during the on-time $T_{ON}$ of power transistor 202, is read through the voltage drop Vcs(t) across sensing resistor 208 and brought to the non-inverting input of OTA 222, whose inverting input is connected to ground.

OTA 222 outputs a current Iq(t) proportional to Vcs(t). For example, in some embodiments, current Iq(t) may be given by $$Iq(t) = g_m \cdot Vcs(t) \quad (1)$$

where $g_m$ is the transconductance of OTA 222.

Current Iq(t) charges integrating capacitor 230 during a time $T_{ON}$. Capacitor 230 is reset by switch 228 as power transistor 202 is turned off and is kept discharged during the remaining part of the switching period $T_S$, so that Vq starts ramping up from 0 V during the next time power transistor 202 turns on.

During normal operation, irrespective of the operating mode (CCM or DCM), voltage Vq developed across integrating capacitor 230 may be given by $$Vq = \frac{g_m}{C_x} \int_0^{T_{on}} Vcs(t) dt = \frac{g_m}{C_x} \int_0^{T_{on}} Rs \cdot Isw(t) dt \quad (2)$$

where $C_x$ represents the capacitance of capacitor 230, $T_{ON}$ represents the time instant at which power transistor 202 is turned off, and Rs represents the resistance of sense resistor 208.

When buck converter 200 is operated in CCM mode, the current Isw(t) flowing through sense resistor 208 may be given by $$Isw_{CCM}(t) = I_{LED\_CCM} + \frac{V_{in} - V_{LED}}{L} \cdot \left(t - \frac{T_{ON}}{2}\right) \quad (3)$$

where $Isw_{CCM}(t)$ represents the current Isw(t) in CCM mode, $I_{LED\_CCM}$ represents the average current $I_{LED}$ in CCM mode, and L represents the inductance of inductor 204.

It follows from Equations 2 and 3 that voltage Vq, in CCM mode, may be given by $$Vq_{CCM} = \frac{g_m}{C_x} \cdot Rs \cdot I_{LED\_CCM} \cdot T_{ON} \quad (4)$$

As will be described in more detail later, since the turn-off condition for power transistor 202 occurs when $Vq_{CCM}$ is equal to $Vq_{ref}$, reference generator 226 may be designed in such a way so as to generate reference voltage $Vq_{ref}$ so as to cause current $I_{LED\_CCM}$ to be independent from voltage $V_{LED}$ or input voltage $V_{in}$ (so that current $I_{LED\_CCM}$ does not vary based on voltage $V_{LED}$ or input voltage $V_{in}$). For example, in some embodiments, current $I_{LED\_CCM}$ may be given by $$I_{LED\_CCM} = \frac{1}{Rs} \cdot \alpha \cdot \frac{C_x}{g_m \cdot T_S} \quad (5)$$

where α is a factor that may be dependent on internal fixed parameters, such as resistors and/or reference current(s) internal to control circuit 220.

As illustrated by Equation 5, in some embodiments, $I_{LED\_CCM}$ may be determined by a user-selectable parameter (e.g., external resistance Rs) and on internally fixed parameters ($C_x$, $g_m$, $T_S$, α) and does not depend on voltage $V_{LED}$ of LED string 106, nor on the input voltage $V_{in}$ or the inductance L of inductor 204.

When buck converter 200 is operated in DCM mode, the current Isw(t) flowing through sense resistor 208 may be given by $$Isw_{DCM}(t) = \frac{V_{in} - V_{LED}}{L} t \quad (6)$$

where $ISW_{DCM}(t)$ represents the current Isw(t) in DCM mode. The current $I_{LED}$ delivered to LED string 106 may be given by $$I_{LED\_DCM} = \frac{V_{in} - V_{LED}}{L} \cdot \frac{T_{ON}}{2} \cdot \frac{T_{ON} + T_{FW}}{T_S} \quad (7)$$

where $I_{LED\_DCM}$ represents the average inductor current $I_{LED}$ in DCM mode, and $T_{FW}$ represents the demagnetization time (e.g., as indicated by voltage $V_{FW}$).

Substituting Equation 6 into Equation 2 and solving the integral yields $$Vq_{DCM} = \frac{g_m}{C_x} \cdot Rs \cdot \frac{V_{in} - V_{LED}}{L} \cdot \frac{T_{ON}^2}{2} \quad (8)$$

where $Vq_{DCM}$ represents the voltage Vq in DCM mode. In view of Equation 7, Equation 8 may be rewritten as $$Vq_{DCM} = \frac{g_m}{C_x} \cdot Rs \cdot I_{LED\_DCM} \cdot \frac{T_{on}}{T_{on} + T_{FW}} \cdot T_S. \quad (9)$$

As will be described in more detail later, since the turn-off condition for power transistor 202 occurs when $Vq_{DCM}$ is equal to $Vq_{ref}$, reference generator 226 may be designed in such a way so as to generate reference voltage $Vq_{ref}$ so as to cause current $I_{LED\_DCM}$ to be independent from voltage $V_{LED}$ or input voltage $V_{in}$ (so that current $I_{LED\_CCM}$ does not vary based on changes in voltage $V_{LED}$ or input voltage $V_{in}$). For example, in some embodiments, current $I_{LED\_DCM}$ may be given by $$I_{LED\_DCM} = \frac{1}{Rs} \cdot \alpha \cdot \frac{C_x}{g_m \cdot T_S} \quad (10)$$

which is identical to Equation 5. Thus, in some embodiments, the average current $I_{LED}$ is advantageously independent of the operating mode (CCM or DCM) of the buck converter 200, e.g., as given by $$I_{LED} = I_{LED\_CCM} = I_{LED\_DCM} = \frac{1}{Rs} \cdot \alpha \cdot \frac{C_x}{g_m \cdot T_S}. \quad (11)$$

Advantages of some embodiments include allowing for accurately controlling output current $I_{LED}$ in either CCM mode or DCM mode while only monitoring current Isw(t) flowing through power transistor 202. Thus, some embodiments advantageously achieve accurately controlling output current $I_{LED}$ in a low-cost, low-complexity manner, and without dissipating excessive energy. For example, some embodiments advantageously avoid using a resistor in series with the inductor for measuring the inductor current $I_L$. In some embodiments, avoiding use of a series resistor for measuring the inductor current may advantageously reduce power dissipation, avoid use of differential sensing with large common-mode dynamics and/or avoid use of a level shifter.

Additional advantages of some embodiments include achieving high output current ($I_{LED}$) accuracy, insensitive to the inductance value L, operating mode (DCM or CCM), input voltage $V_{in}$, and LED string voltage $V_{LED}$. Some embodiments advantageous allow for accommodating different $V_{LED}$ settings without requiring external calibrations or correction means.

In some embodiments, control circuit 220 is implemented in a single (e.g., monolithic) integrated circuit while elements 202, 204, 206, 208, 210 and 106 are implemented external to the integrated circuit (e.g., so that the integrated circuit may include a demagnetization sensing input for receiving voltage $V_{ZCD}$, e.g., as shown in FIG. 2). Thus, some embodiments advantageously allow a user to accurately control current $I_{LED}$ by changing the resistance value Rs of an external component (208). In some embodiments, elements 206 and 210 are integrated in the same package external to the integrated circuit that includes control circuit 220. In some embodiments, elements 202 and/or 204 may be integrated in the same package external to the integrated circuit that includes control circuit 220.

In some embodiments, the circuits of buck converter 200 may be integrated in a different manner. For example, in some embodiments, elements 202 and/or 204 may be integrated in the same package as elements 206, 210, 212, 214, 216, and 218. In some embodiments, interface circuit 210 may be implemented inside the integrated circuit. In some embodiments, each of elements 106, 202, 204, 206, 208, 210, 212, 214, 216, 218, 222, 224, 226, 228 and 230 may be implemented in a discrete manner. Other implementations are also possible.

In some embodiments, control circuit 220 includes reference generator 226, comparator 224, switch 228, capacitor 230, flip-flop 216, clock circuit 214, and transconductance amplifier 222. Other implementations are possible. For example, in some embodiments, portion or all of reference generator 226 may be implemented outside control circuit 220.

In some embodiments, capacitor 234 may be the output capacitor of a previous power stage. For example, in some embodiments, capacitor 108 is connected to node $N_1$, and capacitor 234 may be omitted.

Power transistor 202 may be implemented as a metal-oxide semiconductor field-effect transistor (MOSFET). Power transistor 202 may also be implemented in other ways. For example, in some embodiments, power transistor 202 may be implemented as a gallium nitride (GaN) transistor, or as an insulated-gate bipolar transistor (IGBT).

In some embodiments, clock 214 may be implemented in a conventional manner so as to generate a fixed-frequency clock signal $V_S$ (e.g., with period $T_S$). Operating buck converter 200 with a fixed frequency or with a substantially fixed frequency advantageously allows for using an optimized inductor that mitigates the efficiency drop at low dimming levels.

Interface circuit 210 is configured to generate voltage $V_{ZCD}$ based on current $I_L$ flowing through inductor 204. Voltage $V_{ZCD}$ may be used to sense the demagnetization instant of inductor 204 (e.g., by ZCD circuit 212).

In some embodiments, ZCD circuit 212 is configured to sense the onset of the voltage ringing of the floating terminal of inductor 204 (the drain terminal of power transistor 202) that occurs as current $I_L$ reaches 0 mA (in DCM mode) and produce a signal $V_{FW}$ indicative of the demagnetization time $T_{FW}$. For example, in some embodiments, ZCD circuit 212 includes a demagnetization sensing input for receiving the voltage $V_{ZCD}$ and generates signal $V_F$ based on voltage $V_{ZCD}$ so that signal $V_{FW}$ is high during the demagnetization period of inductor 204. In some embodiments, ZCD 212 may be implemented in a conventional manner. In some embodiments, in CCM mode, the demagnetization time $T_{FW}$ is equal to the power transistor 202 off time $T_{OFF}$.

FIG. 3 shows a schematic diagram of interface circuit 300, according to an embodiment of the present invention. Interface circuit 210 may be implemented as interface circuit 300. Interface circuit 300 includes auxiliary winding 304 of inductor 204, and resistors 306 and 308 forming a voltage divider.

In some embodiments, auxiliary winding 304 tracks the voltage of the drain terminal of power transistor 202 and has a polarity such that its voltage is negative when power transistor 202 is on (during $T_{ON}$).

As shown in FIG. 3, interface circuit 300 generates voltage $V_{ZCD}$ based on $I_L$ current flowing through inductor 204. Voltage $V_{ZCD}$ may be used to sense the demagnetization instant of inductor 204 (e.g., by ZCD circuit 212).

FIG. 4 shows a schematic diagram of interface circuit 400, according to an embodiment of the present invention. Interface circuit 210 may be implemented as interface circuit 400. Interface circuit 400 includes DC blocking capacitor 404 (e.g., connected to the drain terminal of power transistor 202), and resistors 406 and 408 forming a voltage divider. Similarly to interface circuit 300, voltage $V_{ZCD}$ may be used to sense the demagnetization instant of inductor 204 (e.g., by ZCD circuit 212).

FIG. 5 shows a schematic diagram of ZCD circuit 500, according to an embodiment of the present invention. ZCD circuit 212 may be implemented as ZCD circuit 500. ZCD circuit 500 includes flip-flop 504, comparator 502, OR gate 506, and low-pass filter 512 including resistor 510 and capacitor 508. Low-pass filter 512, and comparator 502 form a negative-derivative detector.

In some embodiments, ZCD circuit 500 may be used to determine the demagnetization time $T_{FW}$ from the turning off of power transistor 202 to the current $I_L$ reaching 0 mA (in DCM mode). For example, as shown in FIG. 5, ZCD circuit 500 senses the onset of the voltage ringing of the floating terminal (drain) of power transistor 202 that occurs as inductor current $I_L$ zeroes by monitoring voltage $V_{ZCD}$ (e.g., as generated by interface circuit 300 or 400). Thus, in some embodiments, voltage $V_{FW}$ is reset (e.g., to logic low) when current $I_L$ reaches zero and is set (e.g., to logic high) when power transistor 202 is turned on (e.g., according to clock signal $V_S$). For example, in some embodiments (e.g., as shown in FIG. 5), since the inverting input of comparator 502 receives voltage $V_{ZCD}$, and the non-inverting input receives voltage $V_{ZCD}$ filtered by low-pass filter 512 and offset downwards by offset $V_{th}$, as $V_{ZCD}$ undergoes a negative edge, the output of low-pass filter 512 lags behind, and as their difference exceeds $V_{th}$, comparator 502 triggers, thus resetting flip-flop 504. In some embodiments, in CCM mode, the demagnetization time $T_{FW}$ is equal to the power transistor 202 off time $T_{OFF}$.

In some embodiments, offset $V_{th}$ may be a constant offset voltage, such as 25 mV. Other voltages (e.g., higher than 25 mV, such as 30 mV, or higher, or lower than 25 mV, such as 20 mV, or lower, may also be used).

FIG. 6 shows reference generator 600, according to an embodiment of the present invention. Reference generator 226 may be implemented as reference generator 600. Reference generator 600 includes current source 602, switches 604 and 608, resistor 606, capacitor 614, OR gate 610, and AND gate 612. As shown in FIG. 6, Reference generator 600 may be controlled by signals $V_Q$ and $V_{\bar{Q}}$ (e.g., from flip-flop 216) and signal $V_{FW}$ (e.g., from ZCD 212).

Figure 7:
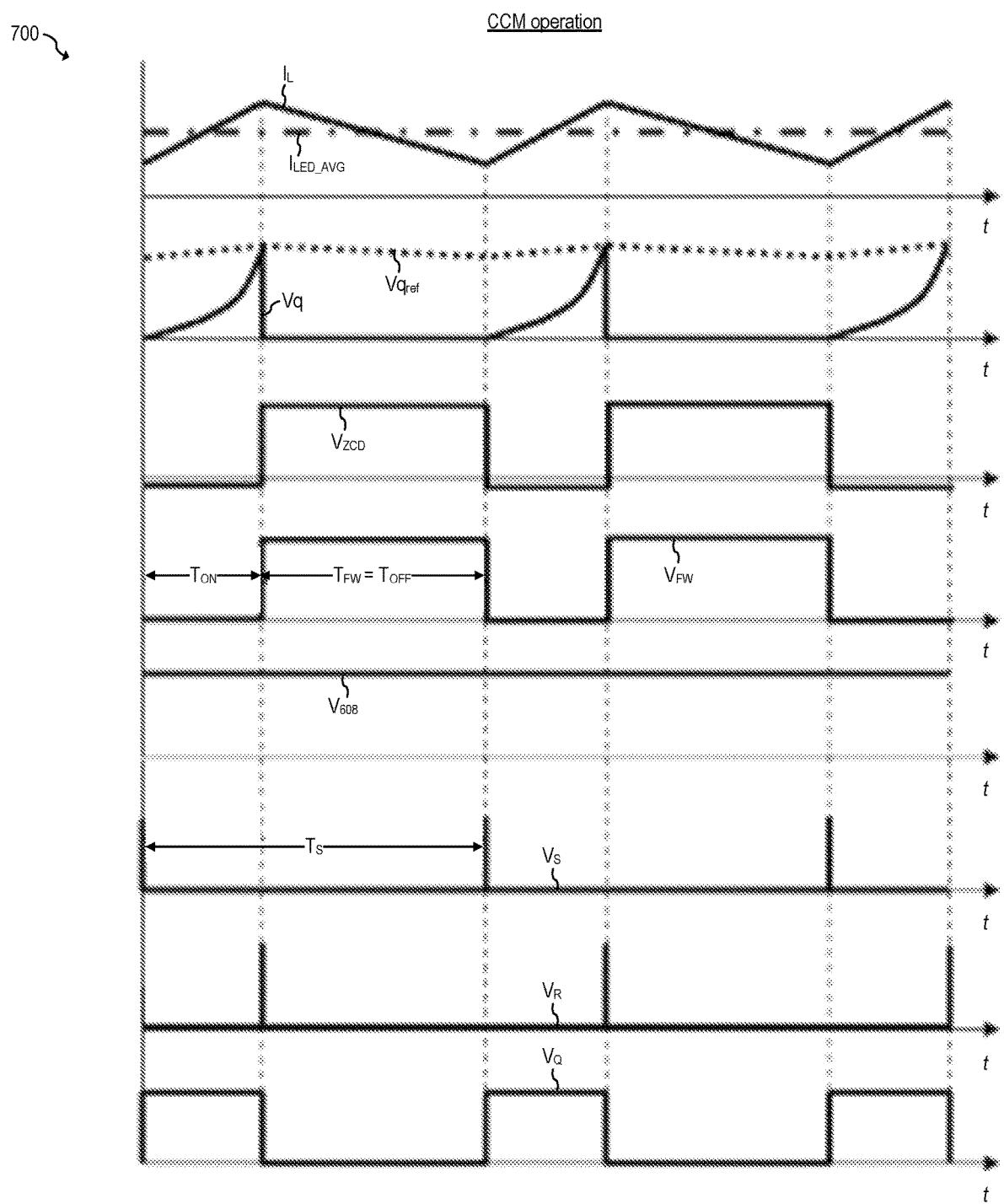
FIGS. 7 and 8 shows waveforms associated with the buck converter of FIG. 2, implemented with the reference generator of FIG. 6, and operating in continuous conduction mode (CCM) and discontinuous conduction mode (DCM) mode, respectively, according to an embodiment of the present invention.

FIG. 7 shows waveforms 700 associated with buck converter 200 implemented with reference generator 600, and operating in CCM mode, according to an embodiment of the present invention.

As can be seen in FIGS. 6 and 7, during CCM mode, switch 608 remains closed every clock cycle of clock $V_S$, as shown by signal $V_{608}$. Switch 604 closes when power transistor 202 is closed, and opens when power transistor 202 opens, as shown by signal $V_Q$. Assuming that the time constant $R_t \cdot C_t$ is much larger than the switching period $T_A$ (e.g., 10 times larger, or more) so that the voltage ripple superimposed on the DC value of voltage $Vq_{ref}$ is negligible, $Vq_{ref}$ may be given by $$Vq_{ref} = I_{ch} \cdot R_t \cdot \frac{T_{ON}}{T_S} \qquad (12)$$

where $R_t$ represent the resistance of resistor 606, $C_t$ represents the capacitance of capacitor 614, and $I_{ch}$ represents the current generated by current source 602.

Based on Equations 4 and 12, in some embodiments, current $I_{LED\_CCM}$ may be given by $$I_{LED\_CCM} = \frac{1}{Rs} \cdot I_{ch} \cdot R_t \cdot \frac{C_x}{g_m \cdot T_S} \qquad (13)$$

where $\alpha$ is given by $$\alpha = I_{ch} \cdot R_t \qquad (14)$$

Figure 8:
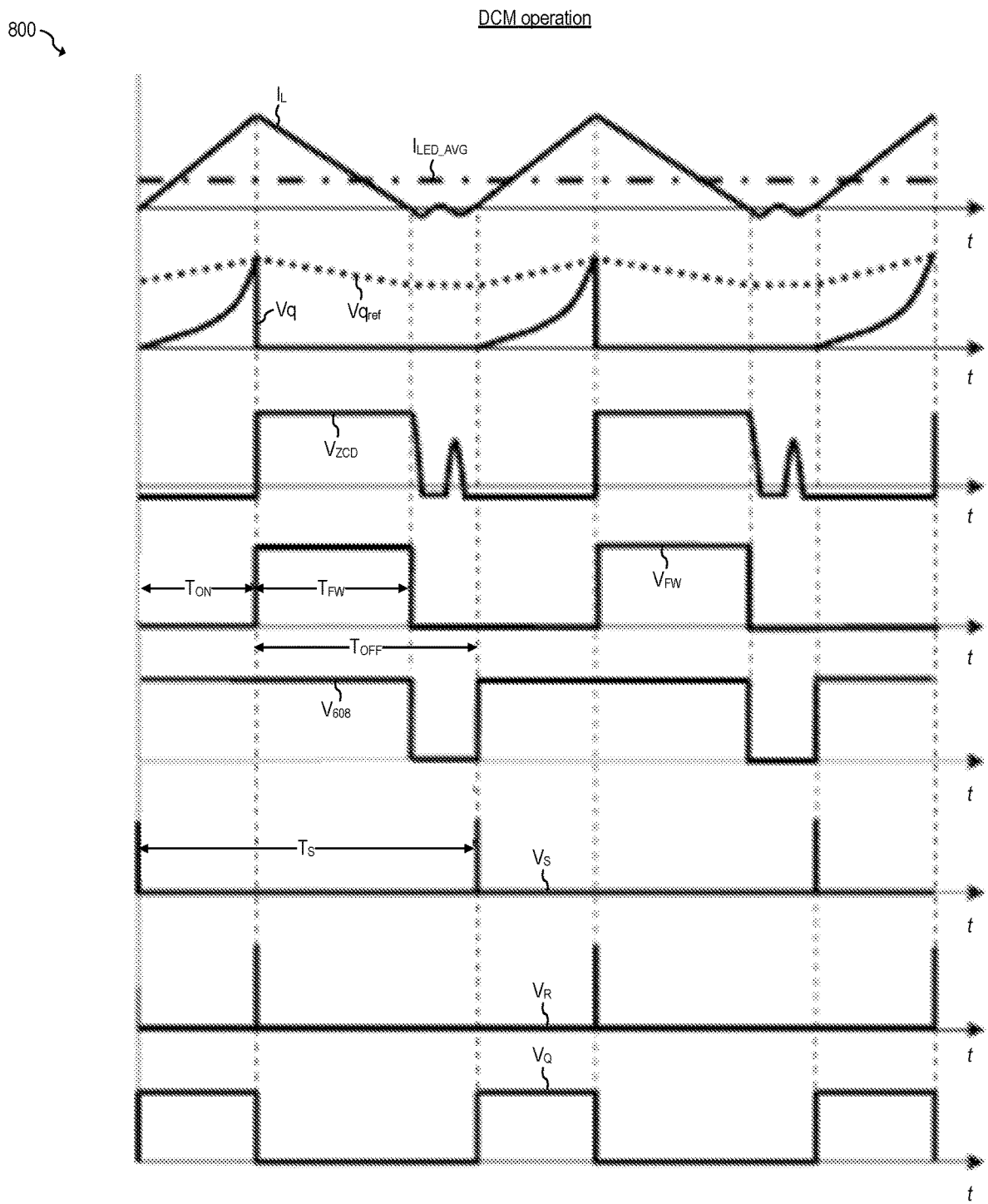

FIG. 8 shows waveforms 800 associated with buck converter 200 implemented with reference generator 600, and operating in DCM mode, according to an embodiment of the present invention.

As can be seen in FIGS. 6 and 8, during DCM mode, switch 608 is closed only while the inductor current $I_L$ is greater than zero (during the time interval $T_{ON}+T_{FW}$), and is open during the remaining part of the switching period $T_S$, as shown by signal $V_{608}$. Switch 604 closes when power transistor 202 is closed, and opens when power transistor 202 opens, as shown by signal $V_Q$. Assuming that the time constant $R_t \cdot C_t$ is much larger than the switching period $T_S$ $Vq_{ref}$ may be given by $$Vq_{ref} = I_{ch} \cdot R_t \cdot \frac{T_{ON}}{T_{ON}+T_{FW}}. \qquad (15)$$

Based on Equations 9 and 15, in some embodiments, current $I_{LED\_DCM}$ may be given by $$I_{LED\_DCM} = \frac{1}{Rs} \cdot I_{ch} \cdot R_t \cdot \frac{C_x}{g_m \cdot T_S} \qquad (16)$$

where $\alpha$ is given by Equation 14. As shown, Equations 13 and 16 are identical, thereby leading to a control scheme of the average current $I_{LED}$ that is independent of the operating mode (CCM, DCM) of buck converter 200, which in some embodiments is captured by Equations 10 and 14.

In some embodiments, as can be seen in Equations 10 and 14, the average current $I_{LED}$ may depend only on resistance Rs (which may be user-selectable) and on internally fixed parameters $I_{ch}$, $R_t$, $C_x$, $g_m$, and $T_S$, and does not dependent on voltage $V_{LED}$ or $V_{in}$, or inductance L, irrespective of the operating mode (CCM, DCM). Some embodiments advantageously achieve high accuracy of control of average current $I_{LED}$ by matching current $I_{ch}$ and transconductance $g_m$, which may dependent on the same (or matched) resistor (not shown), and by generating clock $V_S$ so that it has a fixed period $T_S$ that is based on an internal resistor and capacitor (not shown) that are matched to $R_t$ and $C_x$.

In some embodiments, switch 604 may be omitted, e.g., by controlling an enable input of current sources 602 using signal $V_Q$ or by implementing current source 602 as a voltage-controlled current source controlled by signal $V_Q$.

As illustrated by FIG. 2, the resettable integration circuit that includes switch 228 and capacitor 230 forms a charge-mode control core in which Vq is proportional to the electric charge drawn by buck converter 200 from input $V_{in}$ in a switching cycle during on-time $T_{ON}$. The charge-mode control core may exhibit subharmonic instability issues when buck converter 200 is operated in CCM mode and with fixed frequency (constant $T_S$).

In some embodiments, buck converter 200 transitions from CCM mode to DCM mode when the peak-to-peak ripple of inductor current $I_L$ is higher than twice the average of current $I_L$, which may advantageously help solve subharmonic instability issues when buck converter 200 is operated in CCM mode.

Figure 9:
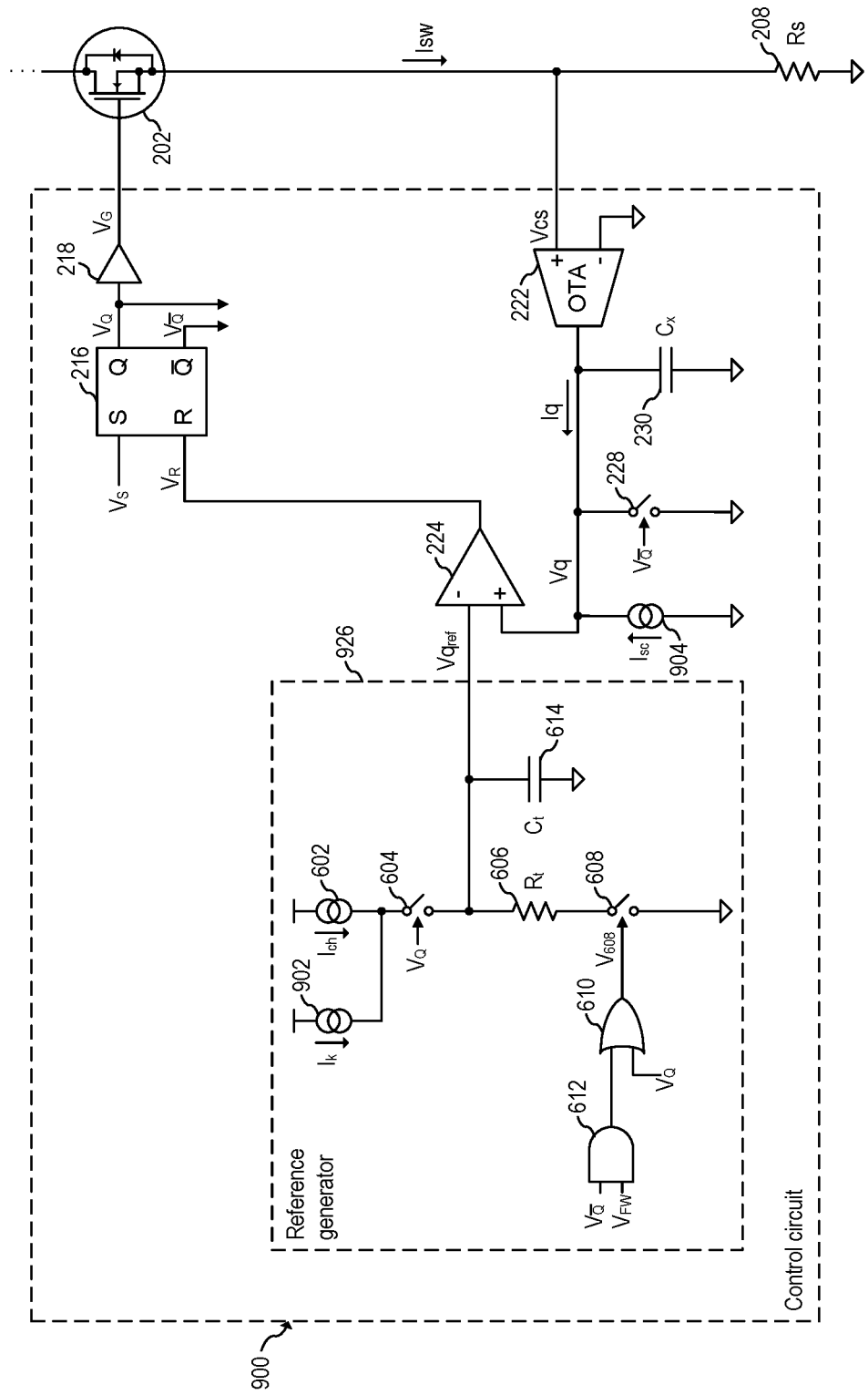
FIG. 9 shows a schematic diagram of a control circuit, according to an embodiment of the present invention.

In some embodiments, transitioning from CCM mode to DCM mode when the peak-to-peak ripple of inductor current $I_L$ is higher than twice the average of current $I_L$ may cause the duty cycle of power transistor 202 to be less than 50%. In some embodiments, duty cycles higher than 50% (and thus, $V_{LED}$ higher than $V_{in\_min}/2$) are possible while achieving an unconditionally stable charge-mode control loop by using slope compensation. For example, FIG. 9 shows a schematic diagram of control circuit 900, according to an embodiment of the present invention. Control circuit 900 includes reference generator 926, comparator 224, current source 904, switch 228, flip-flop 216, gate driver 218, integrating capacitor 230, and transconductance amplifier 222. Reference generator 926 includes current generators 902 and 602, switches 604 and 608, resistor 606, capacitor 614, OR gate 610 and AND gate 612. Control circuit 220 may be implemented as control circuit 900.

As shown in FIG. 9, integrating capacitor 230 is charged by the sum of currents $I_q$ and $I_{sc}$. In some embodiments, current $I_{sc}$ is selected to meet the condition $$I_{sc} > Rs \cdot g_m \frac{V_{LED}}{2L} \cdot T_S \qquad (17)$$

to make the charge-mode control loop unconditionally stable.

In CCM mode, current $I_{LED\_CCM}$ may be given by $$I_{LED\_CCM} = \frac{1}{Rs} \cdot \frac{1}{g_m} \cdot \left( \frac{I_{ch} \cdot R_t \cdot C_x}{T_S} - I_{sc} \right) \quad (18)$$

where $I_{sc}$ represents the current generated by current generator 904. In some embodiments, current $I_{sc}$ is matched with current $I_{ch}$, which may advantageously reduce or eliminate the degradation in accuracy exhibited by current $I_{LED}$. In some embodiments, current $I_k$ may be selected to meet the condition $$I_k = \frac{T_S}{R_t \cdot C_x} \cdot I_{sc} \quad (19)$$

which may advantageously cause $I_{LED\_CCM}$ to be given by Equation 13 while still achieving slope compensation. In some embodiments, current generators 902 and 904 are always active and Equation 18 also applies to DCM mode.

In some embodiments, since current generator 902 is in parallel with current generator 602, current generator 902 may be omitted and the current generated by generator 602 may be increased by $I_k$ to achieve the same result. In some such embodiments, Equation 16 may be modified by replacing $I_{ch}$ with $(I_{ch}-I_k)$.

In some embodiments, buck converter 200 uses a fixed-off-time (FOT) PWM modulation. With FOT PWM modulation, in a switching cycle, power transistor 202 is turned off when the current $I_L$ reaches a predetermined value, and power transistor 202 is turned back on after a predetermined fixed time interval $T_{OFF}$ (e.g., determined by a timer circuit). Using FOT may advantageously enable the control of the average inductor current $I_{LED}$ with CCM operation by controlling the peak of current $I_L$. Using FOT PWM modulation may advantageously help solve subharmonic instability issues when buck converter 200 is operated in CCM mode by making the charge-mode control loop unconditionally stable.

Figure 10:
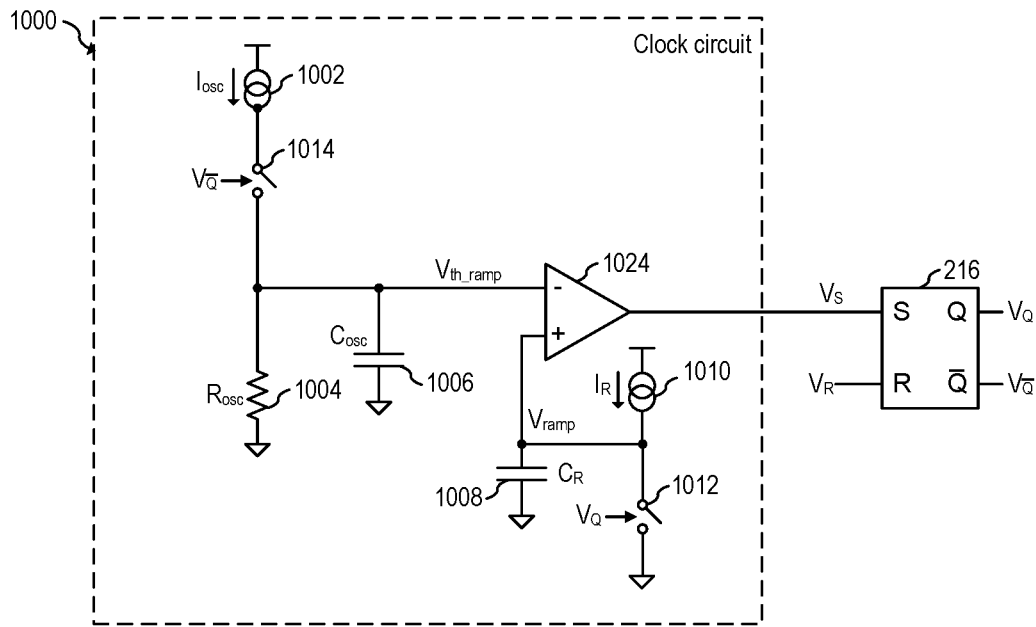
FIGS. 10 and 11 show a schematic diagram of clock circuit, and associated waveforms, respectively, according to an embodiment of the present invention.

In some embodiments, a FOT quasi-fixed frequency (FOT-QFF) modulation. FOT-QFF is based on measuring $T_{ON}$ and slowly modulate $T_{OFF}$ based on $T_{ON}$ so that the sum of $T_{ON}$ and $T_{OFF}$ is constant or substantially constant. In some embodiments, using FOT-QFF modulation may advantageously help solve subharmonic instability issues when buck converter 200 is operated in CCM mode by making the charge-mode control loop unconditionally stable while keeping the operating frequency substantially fixed. For example, FIG. 10 shows a schematic diagram of clock circuit 1000, according to an embodiment of the present invention. Clock circuit 214 may be implemented as clock circuit 1000, and may be used to operate buck converter 200 with a FOT-QFF modulation.

Figure 11:
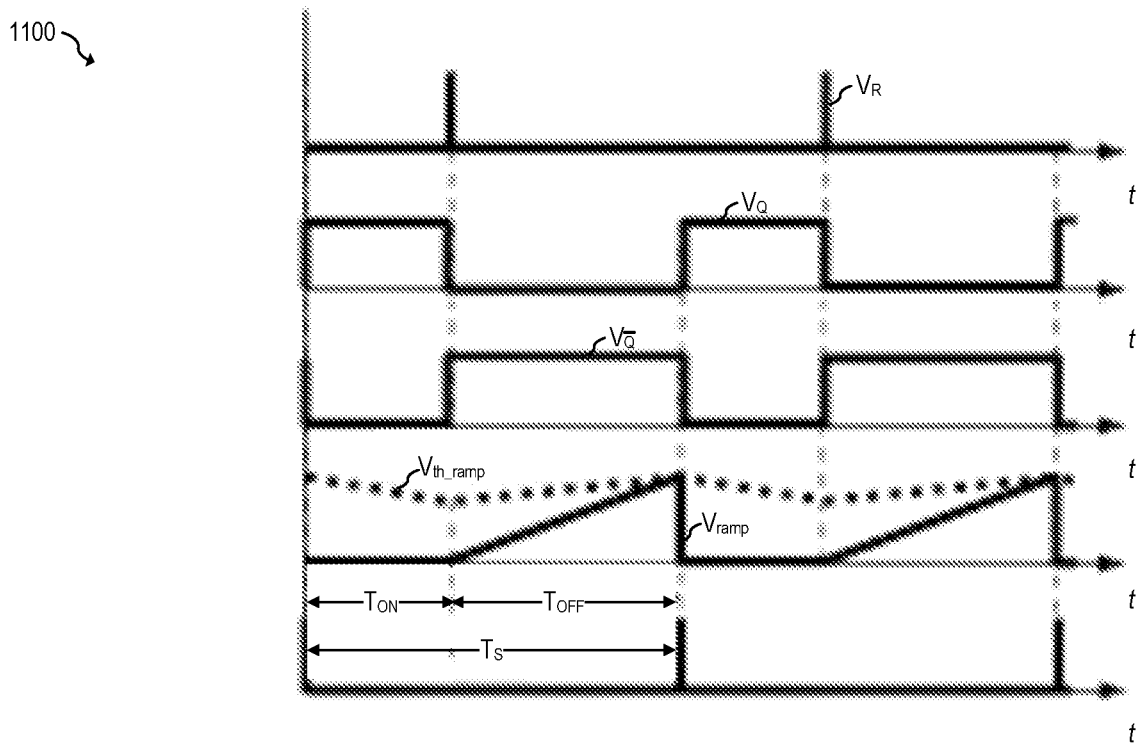

FIG. 11 shows waveforms 1100 associated with clock circuit 1000, according to an embodiment of the present invention. FIGS. 10 and 11 may be understood together.

As can be seen from FIG. 10, assuming that the time constant $R_{osc} \cdot C_{osc}$ is much larger than the switching period $T_S$ (e.g., 10 times larger, or more), voltage reference $V_{th\_ramp}$ may be given by $$V_{th\_ramp} = I_{osc} \cdot R_{osc} \cdot \frac{T_{OFF}}{T_S} \quad (20)$$

where $I_{osc}$ represents the current generated by current generator 1002, and $R_{osc}$ represents the resistance of resistor 1004. Since $T_{OFF}$ may be determined by voltage $V_{ramp}$ crossing $V_{th\_ramp}$, then $$T_{OFF} = C_R \frac{V_{th\_ramp}}{I_R} = \frac{I_{osc}}{I_R} \cdot R_{osc} \cdot C_R \frac{T_{OFF}}{T_S} \quad (21)$$

where $C_R$ represents the capacitance of capacitor 1008, and $I_R$ represents the current generated by current generator 1010. From Equation 21, it follows that switching period $T_S$ may be given by $$T_S = \frac{I_{osc}}{I_R} \cdot R_{osc} \cdot C_R. \quad (22)$$

In some embodiments, since the mechanism that adjusts $T_{OFF}$ responds to perturbations with a time constant $R_{osc} \cdot C_{osc}$ that is much larger than the switching period $T_S$, the dynamics of a FOT-QFF-controlled system is substantially similar to that of an FOT-controlled system.

In some embodiments, matching $R_t$ and $C_x$ with $R_{osc}$ and $C_{osc}$ advantageously allows for accurately controlling the average current $I_{LED}$.

Figure 12:
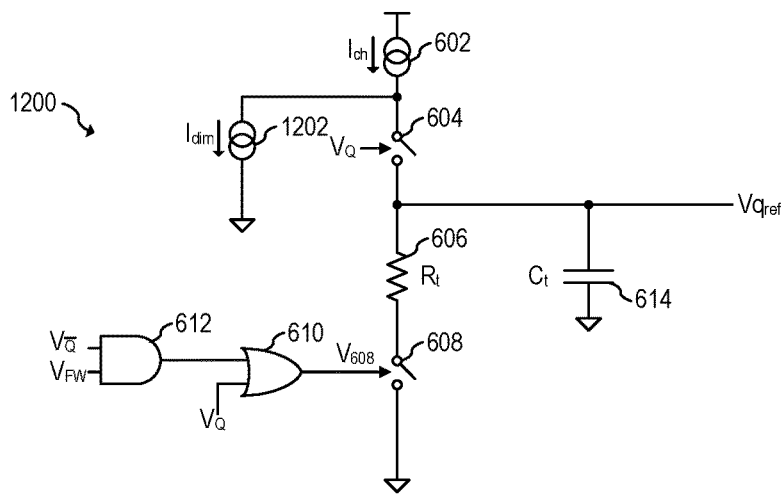
FIG. 12 shows a schematic diagram of a reference generator, according to an embodiment of the present invention.

Some embodiments allow for changing the regulation setpoint of current $I_{LED}$ in a continuous manner (analog dimming). In some embodiments, analog diming is achieved by reducing the current $I_{ch}$. For example, FIG. 12 shows a schematic diagram of reference generator 1200, according to an embodiment of the present invention. Reference generator 226 may be implemented as reference generator 1200.

Reference generator 1200 operates in a similar manner as reference generator 600. Reference generator 1200, however, includes current generator 1202 for subtracting current $I_{dim}$ from reference current $I_{ch}$. Thus, in some embodiments, the average current $I_{LED}$ may be given by $$I_{LED} = \frac{1}{Rs} \cdot (I_{ch} - I_{dim}) \cdot R_t \cdot \frac{C_x}{g_m \cdot T_S} \quad (23)$$

where $I_{dim}$ represents the current generated by current generator 1202. As shown by Equation 23, current $I_{LED}$ may be reduced down to zero (by having $I_{dim}$ equal $I_{ch}$). In some embodiments, dimming may be achieved by varying current $I_{ch}$ and omitting current $I_{dim}$.

In some embodiments, current source 1202 may be a voltage-controlled current source that generates current $I_{dim}$ based on voltage $V_{dim}$, and where voltage $V_{dim}$ is received, e.g., from an input terminal of the control circuit (e.g., 220).

In some embodiments, reference generator 926 may be modified to include current source 1202 in a similar manner as shown in FIG. 12.

In some embodiments, dimming may be achieved by increasing the switching period $T_S$. In some embodiments, dimming may be achieved by increasing switching period $T_S$ and adjusting current $I_{dim}$, which may advantageously allow a deeper dimming with a limited excursion of $I_{dim}$.

Looking back to FIG. 2, the propagation delay $\Delta T$ from the time in which voltage Vq is equal to $Vq_{ref}$, to the time power transistor 202 is turned off may not be insignificant. Delaying turning off power transistor 202 by $\Delta T$ may cause current $I_{LED}$ to be larger than predicted by, e.g., Equations 11 and 23. The extra inductor current $I_L$ (generated as a result of the additional time $\Delta T$ that power transistor 202 is on) may depend on the applied $V_{in}-V_{LED}$, thus, introducing a dependence on both $V_{in}$ and $V_{LED}$. For example, assuming that the turn-off condition of power transistor 202 occurs at time $t_{202\_off}=T_{ON}-\Delta T$, then it is possible to calculate the value of $Vq_{ref\_202\_off}$ at time $t_{202\_off}$ as $$Vq_{ref\_202\_off} = \frac{g_m}{C_x} \cdot \int_0^{T_{ON}-\Delta T} Rs \cdot Isw(t)dt = I_{ch} \cdot R_t \cdot \frac{T_{ON} - \Delta T}{T_S} \quad (24)$$

and $I_{LED}$ (in CCM mode) may be given by $$I_{LED\_CCM} = I_{LEDo} + \frac{V_{IN} - V_{LED}}{2L} \cdot \Delta T \quad (25)$$

where $I_{LED0}$ represents the average current $I_{LED}$ determined by, e.g., Equation 13.

Figure 13:
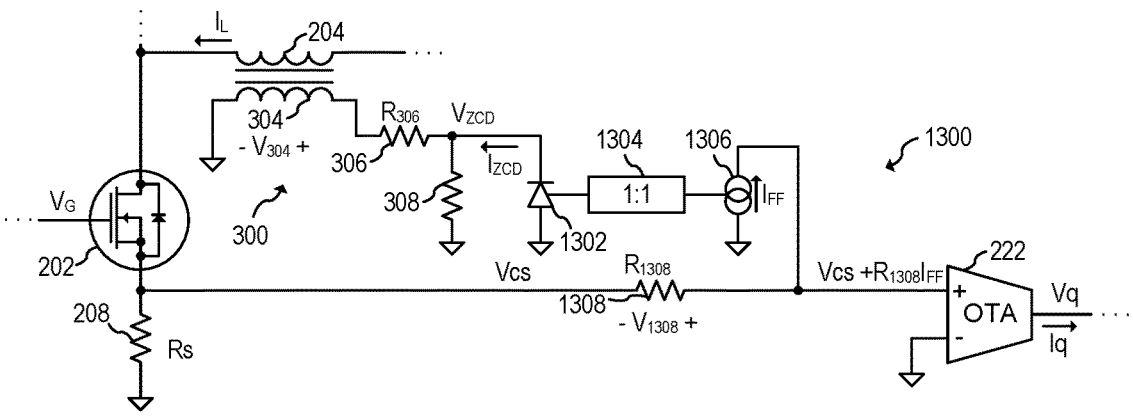
FIG. 13 shows schematic diagram of a portion of a control circuit coupled to the interface circuit of FIG. 3, according to an embodiment of the present invention.

In some embodiments, voltage feedforward is used to compensate for propagation delay $\Delta T$. For example, in some embodiments, a voltage feedforward circuit may inject a current $I_{FF}$, to be summed with current Isw, based on voltage $V_{ZCD}$ received from interface circuit 210. For example, FIG. 13 shows a schematic diagram of a portion of control circuit 1300 coupled to interface circuit 300, according to an embodiment of the present invention. Control circuit 1300 includes diode 1302, current mirror 1304, current generator 1306, resistor 1308, and transconductance amplifier 222. Control circuit 220 may be implemented as control circuit 1300.

In CCM mode, during the on-time $T_{ON}$ of power transistor 202, the voltage $V_{304}$ across auxiliary winding 304 may be given by $$V_{304} = -\frac{(V_{in} - V_{LED})}{n} \quad (26)$$

where n represents the turn ration between the number of turns of inductor 204 and the number of turns of auxiliary winding 304. Current $I_{ZCD}$ may be given by $$I_{ZCD} = -\frac{(V_{in} - V_{LED})}{n \cdot R_{306}} \quad (27)$$

where $R_{306}$ represents the resistance of resistor 306.

As shown by elements 1304 and 1306, current $I_{ZCD}$ is mirrored to generate current $I_{FF}$, which causes an offset $V_{1308}$ that may be given by $$V_{1308} = R_{308} \cdot I_{FF} \quad (28)$$

where $R_{1308}$ represents the resistance of resistor 1308. Thus, $V_{qref\_202\_off}$ may be given by $$Vq_{ref\_202\_off} = \quad (29)$$
$$\frac{g_m}{C_x} \cdot \int_0^{T_{ON}-\Delta T} [Rs \cdot Isw(t) + V_{1308}]dt = I_{ch} \cdot R_t \cdot \frac{T_{ON} - \Delta T}{T_S}$$

and current $I_{LED}$ may be given by $$I_{LED\_CCM} = I_{LEDo} + \frac{V_{IN} - V_{LED}}{2L} \cdot \Delta T - \frac{V_{1308}}{Rs} \quad (30)$$

In some embodiments, $R_{306}$ is selected to be $$R_{306} = \frac{2}{n} \cdot \frac{R_{1308} \cdot L}{Rs \cdot \Delta T} \quad (31)$$

to cause $I_{LED}$ to be equal to $I_{LED0}$, and, thus, advantageously compensate for the propagation delay $\Delta T$. The same result advantageously also applies when buck converter 200 operates in DCM mode.

Figure 14:
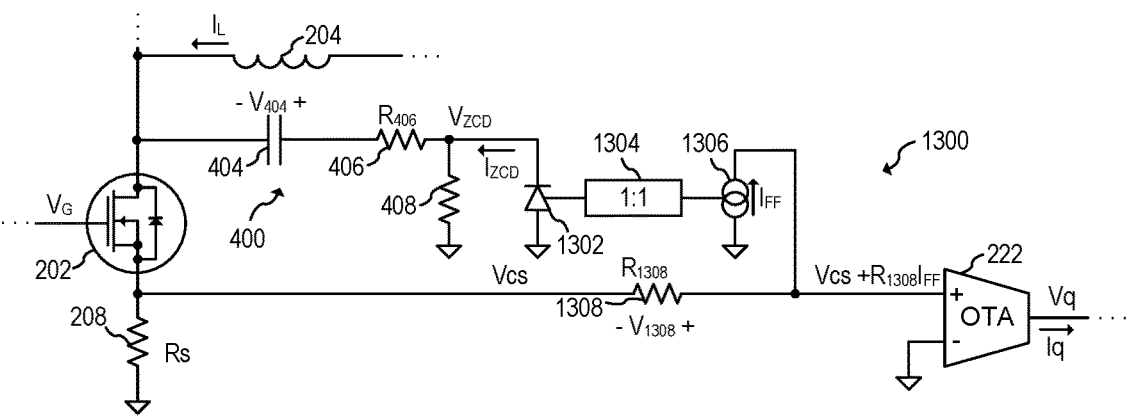
FIG. 14 shows schematic diagram of a portion of the control circuit of FIG. 13 coupled to the interface circuit of FIG. 4, according to an embodiment of the present invention.

As shown in FIG. 13, interface circuit 210 may be implemented as interface circuit 300. Other implementations are also possible. For example, FIG. 14 shows a schematic diagram of a portion of control circuit 1300 coupled to interface circuit 400, according to an embodiment of the present invention.

In CCM mode, during the on-time $T_{ON}$ of power transistor 202, the voltage $V_{404}$ across DC blocking capacitor 404 may be given by $$V_{404} = -(V_{in} - V_{LED}) \quad (32)$$

and current $I_{ZCD}$ may be given by $$I_{ZCD} = -\frac{(V_{in} - V_{LED})}{R_{406}} \quad (33)$$

where $R_{406}$ represents the resistance of resistor 406.

Equations 28-30 similarly apply to the circuit of FIG. 14. In some embodiments, $R_{406}$ is selected to be $$R_{406} = 2 \cdot \frac{R_{1308} \cdot L}{Rs \cdot \Delta T} \quad (34)$$

to cause $I_{LED}$ to be equal to $I_{LED0}$, and, thus, advantageously compensate for the propagation delay $\Delta T$. The same result advantageously also applies when buck converter 200 operates in DCM mode.

Advantages of some embodiments include enabling lighting engineers to design LED lamp drivers that meet market and regulatory requirements with less effort and at a lower cost.

Figure 15:
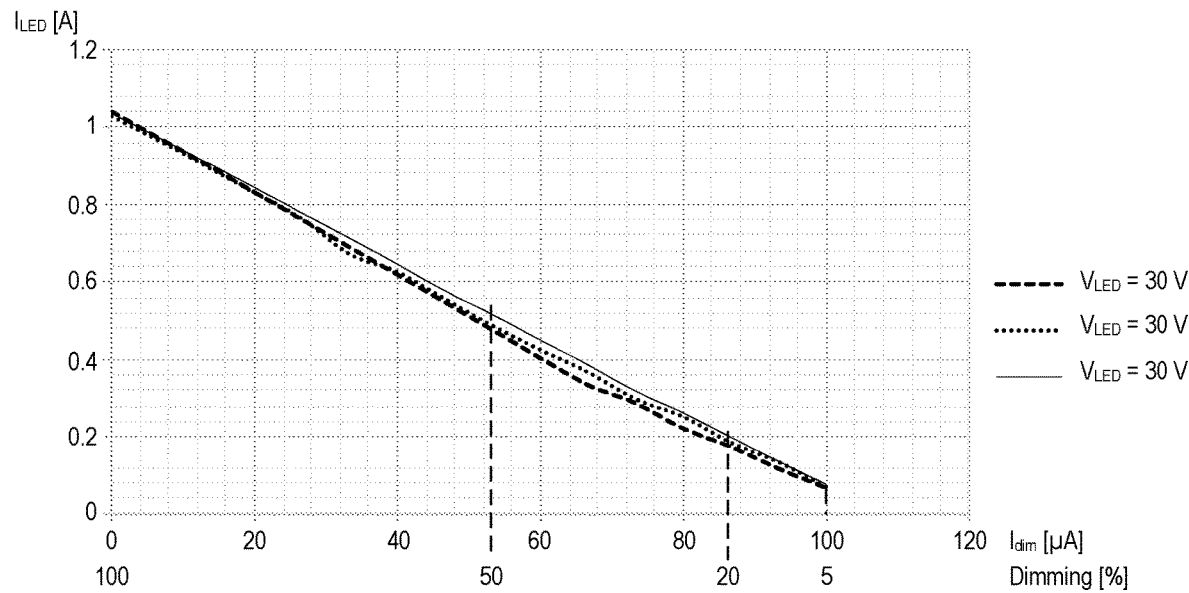
FIGS. 15 and 16 show simulation results associated with the buck converter of FIG. 2, according to an embodiment of the present invention.
Figure 16:
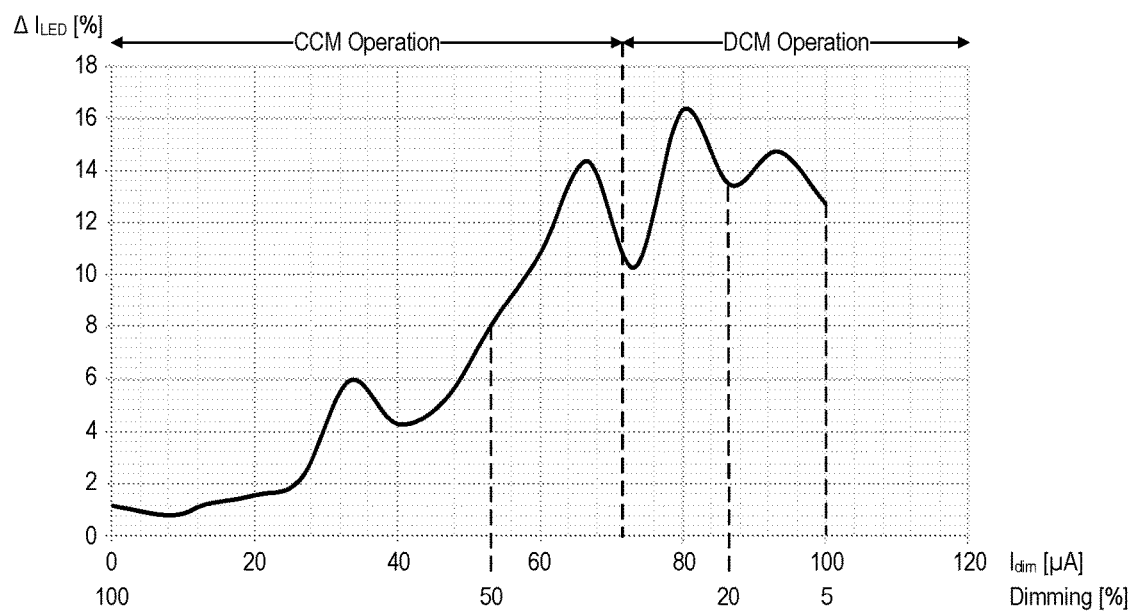

FIGS. 15 and 16 show simulation results associated with buck converter 200, according to an embodiment of the present invention. The simulated buck converter 200 is implemented with control circuit 220 including reference generator 226 implemented as reference generator 1200, including clock circuit 214 implemented as clock circuit 1000 and implemented voltage feedforward circuit as shown in FIG. 13. The simulated buck converter 200 is designed to receive a $V_{in}$ between 108 V to 132 V, generate a voltage $V_{LED}$ between 30 V to 90 V, produce an output current $I_{LED}$ of 1 A, having a diming range between 5% and 100%, a switching period Ts of 7.5 μs, where inductor 204 has an inductance L of 200 μH, where output capacitor 232 has a capacitance of 2.2 μF and where resistor 208 has a sense resistance Rs of 0.2Ω. Other parameters of the simulated buck converter 200 include current $I_{ch}$ of 1 μA, resistance $R_t$ of 4 MΩ, capacitances of $C_t$ and $C_x$ of 50 pF and 20 pF, respectively, transconductance $g_m$ of 50 µS, and a dimming gain of 1/100 A/A.

FIG. 15 illustrates the measured relationship captured by Equation 23 for minimum $V_{LED}$ (30 V) nominal $V_{LED}$ (60 V), and maximum $V_{LED}$ (90 V), in the 5% to 100% range of $I_{LED}$, according to an embodiment. FIG. 16 illustrates the deviation of $I_{LED}$ for the min-to-max variation of $V_{LED}$ in the 5% to 100% range of $I_{LED}$, according to an embodiment. As shown in FIGS. 15 and 16, the relationship between $I_{LED}$ and $I_{dim}$ is very linear, and the sensitivity of $I_{LED}$ versus $V_{LED}$ is less than 2%, which may be advantageous in some embodiments.

In some embodiments in which current $I_{ch}$ is fixed, it can be derived from Equations 13 and 16 that $$\beta = \frac{I_{LED}}{I_{ch}} = \frac{1}{Rs} \cdot R_t \cdot \frac{C_x}{g_m \cdot T_S} \qquad (35)$$

where β is a constant. Thus, in some embodiments, current $I_{LED}$ is proportional to a fixed, internally generated current $I_{ch}$, where the proportionality coefficient β can be set by a user by selecting the value of resistance Rs. As previously shown, regulation of current $I_{LED}$ may be achieved by measuring only a portion of inductor current $I_L$ (the part that flows through power transistor 202), and reconstructing the missing portion based on the on ($T_{ON}$) and off ($T_{OFF}$) times of power transistor 202 (in CCM mode), and based on time ($T_{ON}$) of power transistor 202 and the freewheeling time ($T_{FW}$) (in DCM mode). In some embodiments, the information of the on and off times of power transistor 202 and of freewheeling time $T_FW$ is encoded in signals $V_Q$, $V_{\bar{Q}}$, and $V_{FW}$, and is used to control switches of reference generator 226 (e.g., switches 604, 608) as well as other switches of the control circuit (e.g., switches 228, 1012, 1014).

As illustrated by FIGS. 2 and 6, in some embodiments, switch 604 may be controlled by signal $V_Q$, and switch 608 may be controlled by signals $V_Q$ OR ($V_{\bar{Q}}$ AND $V_FW$) to achieve a constant average current $I_L$, e.g., to be used in LED driving or battery charging (e.g., by replacing LED string 106 with a rechargeable battery).

The inventors realized that changing the control logic of some of the switches (e.g., switches 604, 608) of control circuit 220 may allow using control circuit 220 in topologies different than a buck converter and/or for purposes other than regulating current. For example, in some embodiments, by changing the control logic for switches 604 and 608, the average inductor current $I_{LED}$ (or part of it) can be controlled in other topologies (e.g., boost, buck-boost) to serve different purposes.

The inventors also realized that in some embodiments, current $I_{ch}$ or $I_{dim}$ may be controlled by an outer feedback loop, e.g., to regulate an output voltage of a converter (either non-isolated or isolated). Thus, some embodiments realize an average current mode control scheme using a single error amplifier.

FIGS. 17-23 show schematic diagrams of switching converters, according to embodiments of the present invention.

Figure 17:
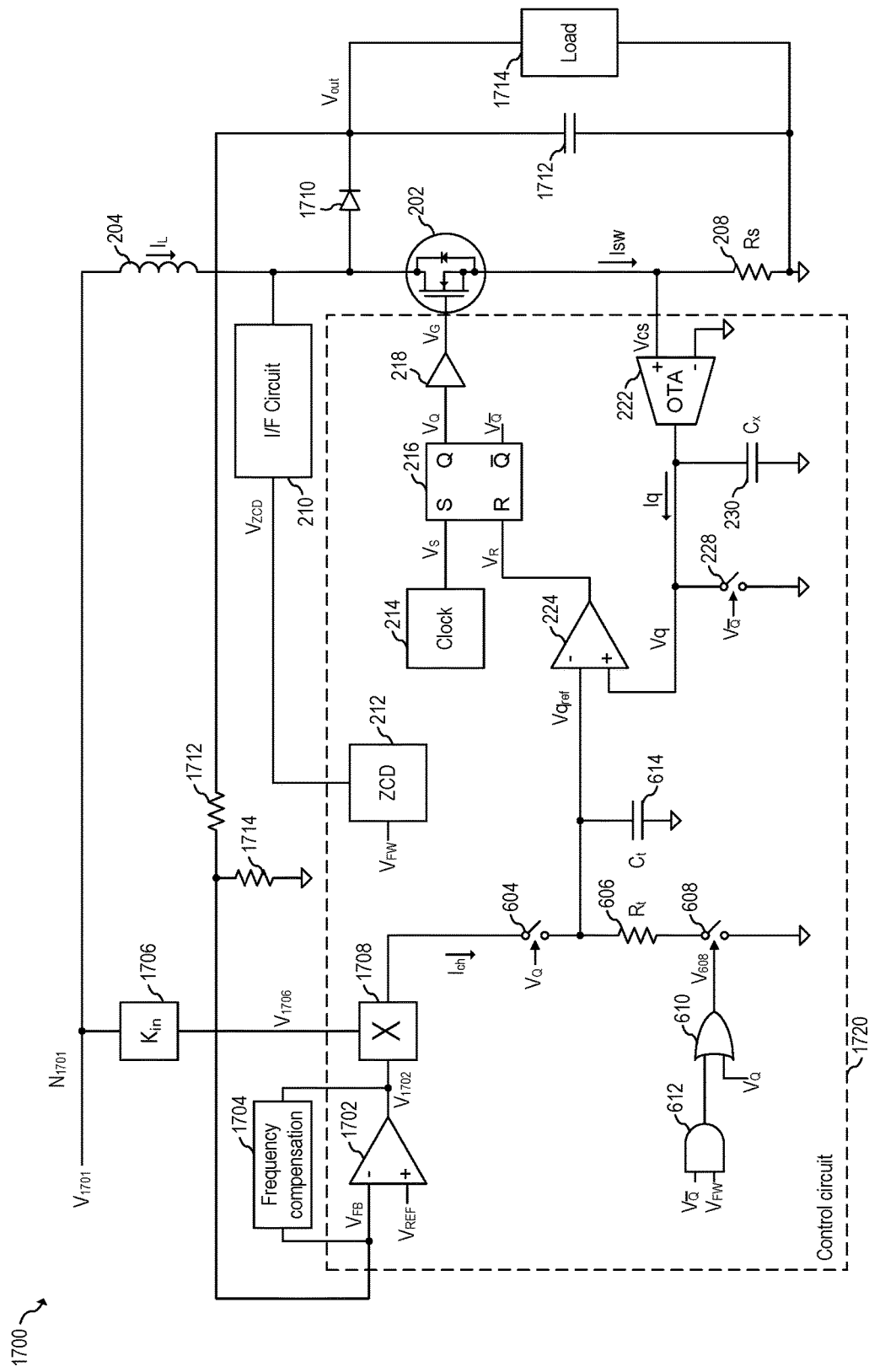
FIGS. 17-23 show schematic diagrams of switching converters, according to embodiments of the present invention.

FIG. 17 shows a schematic diagram of CCM/DCM boost PFC converter 1700, according to an embodiment of the present invention. Boost converter 1700 includes control circuit 1720, power transistor 202, diode 1710, output capacitor 1712, inductor 204, voltage divider 1706, interface circuit 210, frequency compensation circuit 1704, and resistors 208, 1712, and 1714. In some embodiments, boost converter 1700 regulates output voltage $V_{out}$ based on reference voltage $V_{REF}$.

As shown in FIG. 17, control circuit 1720 operates in a similar manner as control circuit 220 when reference generator 226 is implemented as reference generator 600. Control circuit 1720, however, dynamically controls current $I_{ch}$ using a control loop that is based on output voltage $V_{out}$ and input voltage $V_{1701}$ instead of using current generator 602.

During normal operation, node $N_{170}$, receives a rectified AC signal $V_{1701}$. Multiplication circuit 1708 receives voltage $V_{1706}$ (scaled from voltage $V_{1701}$) and voltage $V_{1702}$ (from error amplifier 1702) and generates current $I_{ch}$, which may be given by $$I_{ch} = V_{1702} \cdot V_{1706} \qquad (36).$$

In some embodiments, thus, current $I_{ch}$ is shaped as a rectified sinusoid. Since current $I_L$ flowing through inductor 204 may be given by $$I_L = \beta \cdot I_{ch} \qquad (37)$$

error amplifier 1702 modulates current $I_{ch}$ to cause $V_{FB}$ to be equal to $V_{REF}$, thereby regulating voltage $V_{out}$ to a target voltage that is based on reference voltage $V_{REF}$.

Frequency compensation circuit 1704 provides frequency compensation to error amplifier 1702 and may be implemented in any way known in the art.

Multiplication circuit 1708 is configured to multiply (e.g., in an analog manner) signals $V_{1702}$ and $V_{1706}$ and produce a current proportional to the result of such multiplication. Multiplication circuit 1708 may be implemented in any way known in the art.

As shown in FIG. 17, advantages of some embodiments include using a single error amplifier for regulating the average current as well as the output voltage (as opposed to two error amplifiers, each with its own frequency compensation). For example, in some embodiments, averaging capacitor 614 may be used instead of an error amplifier to realize average current mode control, advantageously simplifying the control scheme. In some embodiments, the current loop is compensated by averaging capacitor 614.

Figure 18:
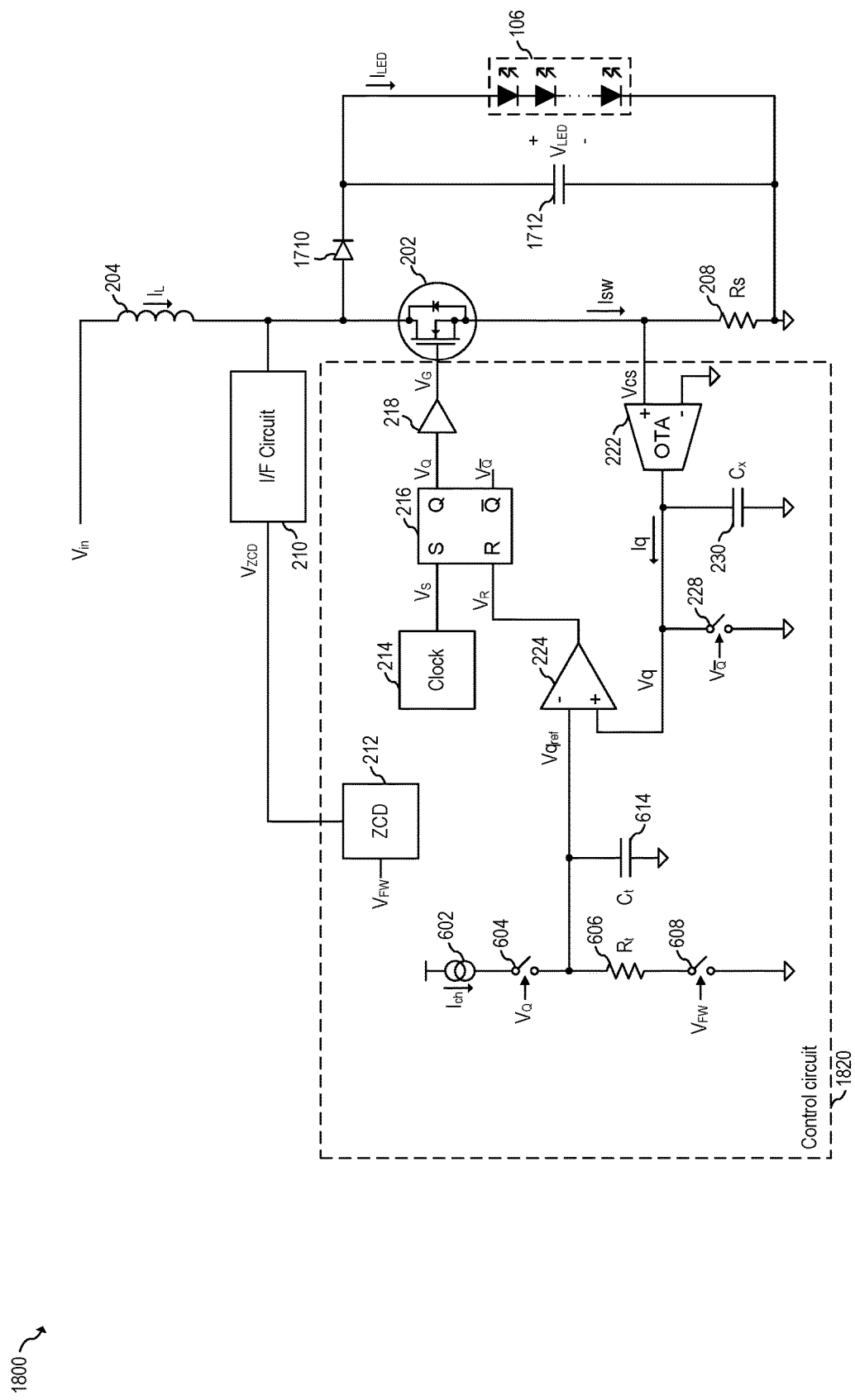

FIG. 18 shows a schematic diagram of CCM/DCM boost converter 1800, according to an embodiment of the present invention. Boost converter 1800 includes control circuit 1820, power transistor 202, diode 1710, output capacitor 1712, inductor 204, interface circuit 210, and resistor 208. In some embodiments, boost converter 1800 regulates current $I_{LED}$ for, e.g., driving a LED string or recharging a battery, while keeping voltage $V_{LED}$ higher than voltage $V_{in}$. In some embodiments, voltage $V_{in}$ may be voltage $V_{102}$ (e.g., received from converter 102).

As shown in FIG. 18, control circuit 1820 operates in a similar manner as control circuit 220 when reference generator 226 is implemented as reference generator 600. Control circuit 1820, however, controls switch 608 with signal $V_{FW}$ instead of using signal $V_{608}$.

Figure 19:
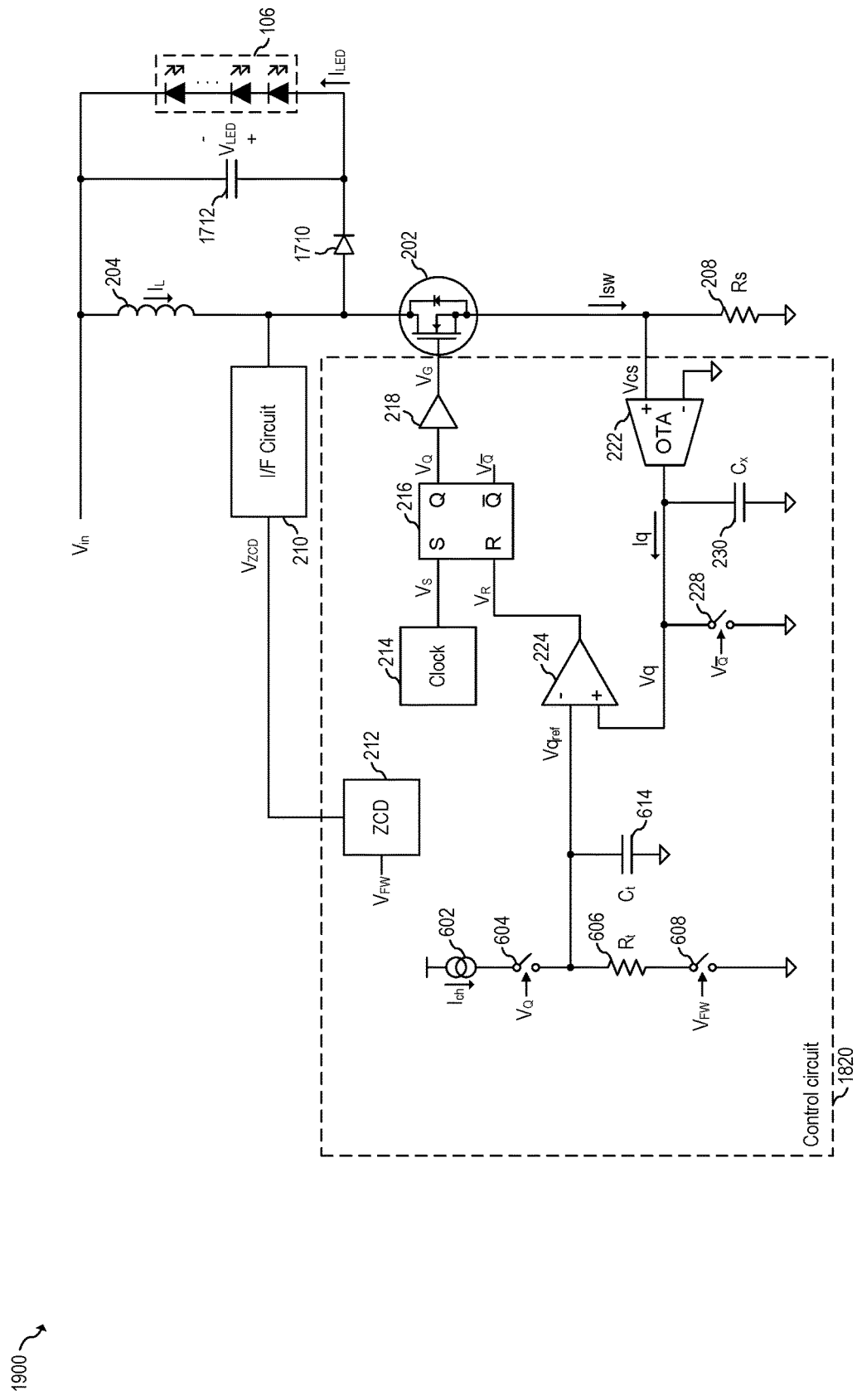

FIG. 19 shows a schematic diagram of CCM/DCM buck-boost converter 1900, according to an embodiment of the present invention. Buck-boost converter 1900 includes control circuit 1820, power transistor 202, diode 1710, output capacitor 1712, inductor 204, interface circuit 210, and resistor 208. In some embodiments, buck-boost converter 1900 regulates current $I_{LED}$ for, e.g., driving a LED string or recharging a battery. In some embodiments, voltage $V_{in}$ may be voltage $V_{102}$ (e.g., received from converter 102).

As shown in FIG. 19, the same control circuit 1820 may be used for buck-boost operation by changing the way diode 1710, capacitor 1712, and load 106 are connected.

Figure 20:
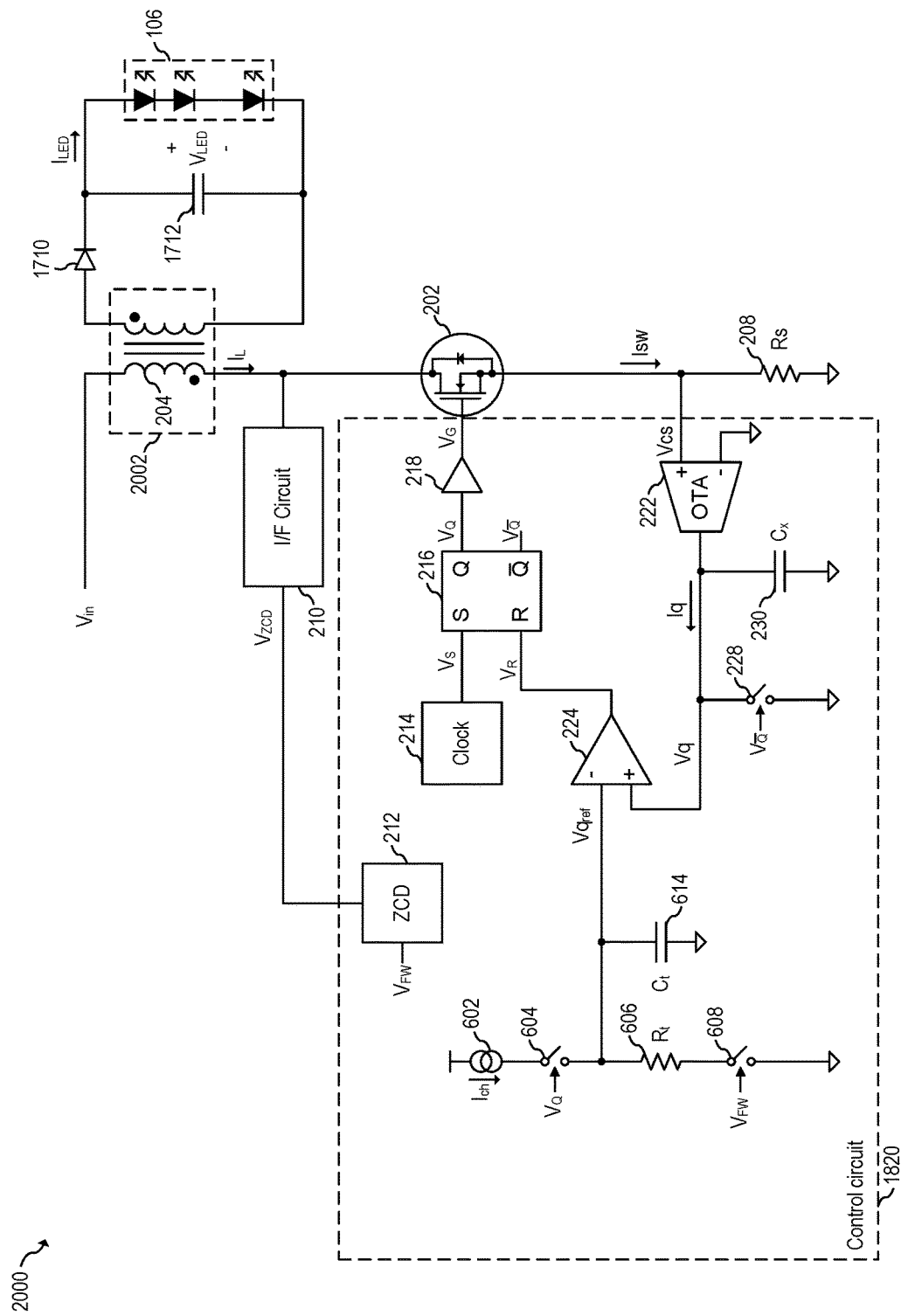

FIG. 20 shows a schematic diagram of CCM/DCM flyback converter 2000, according to an embodiment of the present invention. Flyback converter 2000 includes control circuit 1820, power transistor 202, diode 1710, output capacitor 1712, transformer 2000, interface circuit 210, and resistor 208. In some embodiments, flyback converter 2000 regulates current $I_{LED}$, e.g., for driving a LED string or recharging a battery. In some embodiments, voltage $V_{in}$ may be voltage $V_{102}$ (e.g., received from converter 102).

As shown in FIG. 20, the same control circuit 1820 may be used for buck-boost operation by replacing inductor 204 with transformer 2002, and changing the way diode 1710, capacitor 1712, and load 106 are connected.

Figure 21:
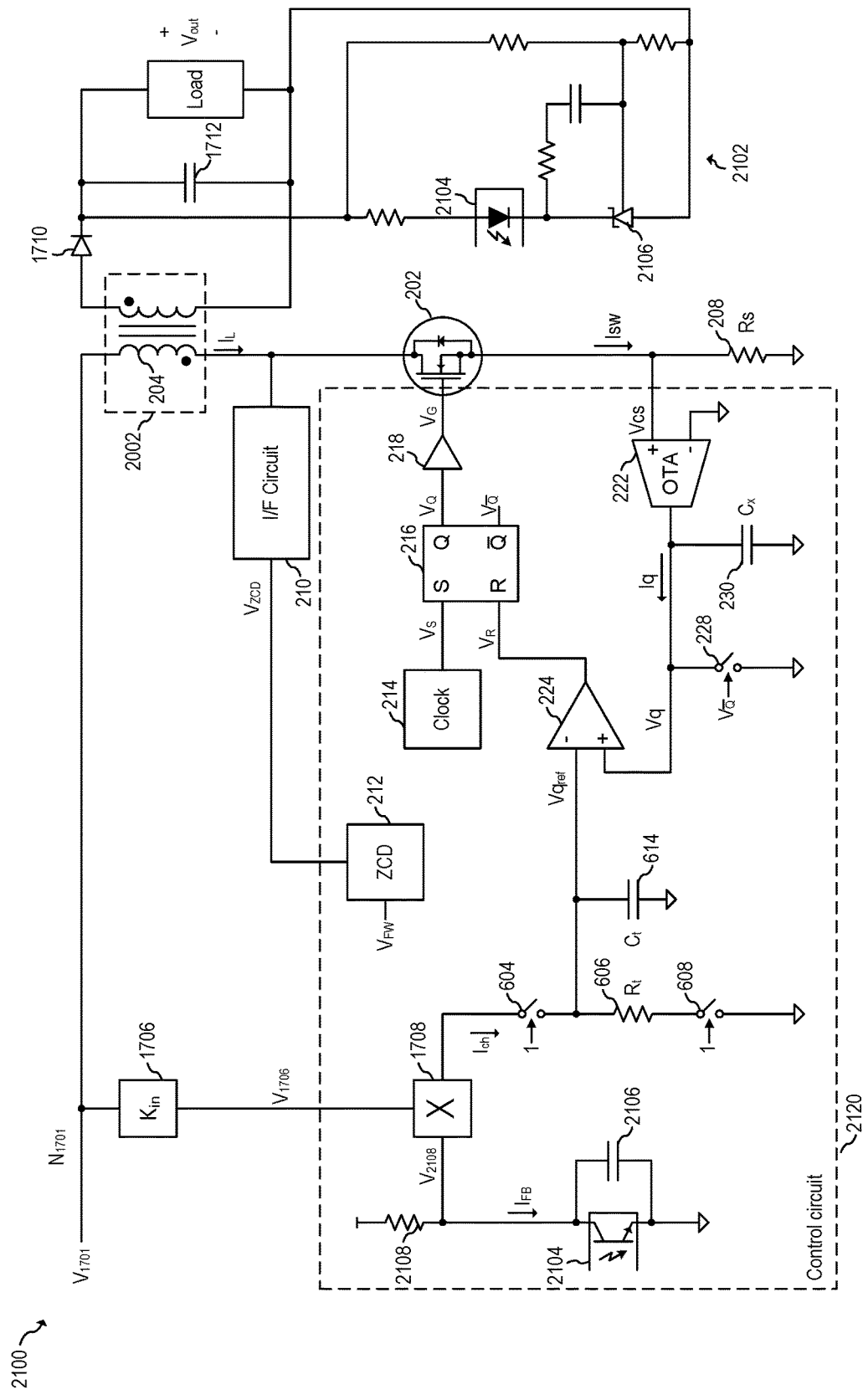

FIG. 21 shows a schematic diagram of isolated CCM/DCM flyback PFC converter 2100, according to an embodiment of the present invention. Flyback converter 2100 includes control circuit 2120, power transistor 202, diode 1710, output capacitor 1712, transformer 2002, voltage divider 1706, interface circuit 210, feedback circuit 2102, and resistor 208. Feedback circuit 2102 includes opto-coupler 2104 and shunt regulator 2106 (e.g., an adjustable precision Zener shunt regulator). In some embodiments, flyback converter 2100 regulates output voltage $V_{out}$ based on the voltage across shunt regulator 2106.

As shown in FIG. 21, control circuit 2120 operates in a similar manner as control circuit 1720. Control circuit 2120, however, generates current $I_{ch}$ based on feedback current $I_{FB}$, which is generated by opto-coupler 2104 based on output voltage $V_{out}$. Similar to control circuit 1720, current $I_{ch}$ may be shaped as a rectified sinusoid.

As shown in FIG. 21, in some embodiments, switches 604 and 608 are always closed. Thus, in some embodiments, switches 604 and 608 may be omitted.

Converter 2100 may be used, e.g., in high power applications (e.g., 200 W or more). In some embodiments, converter 2100 may be used in street lighting applications.

Figure 22:
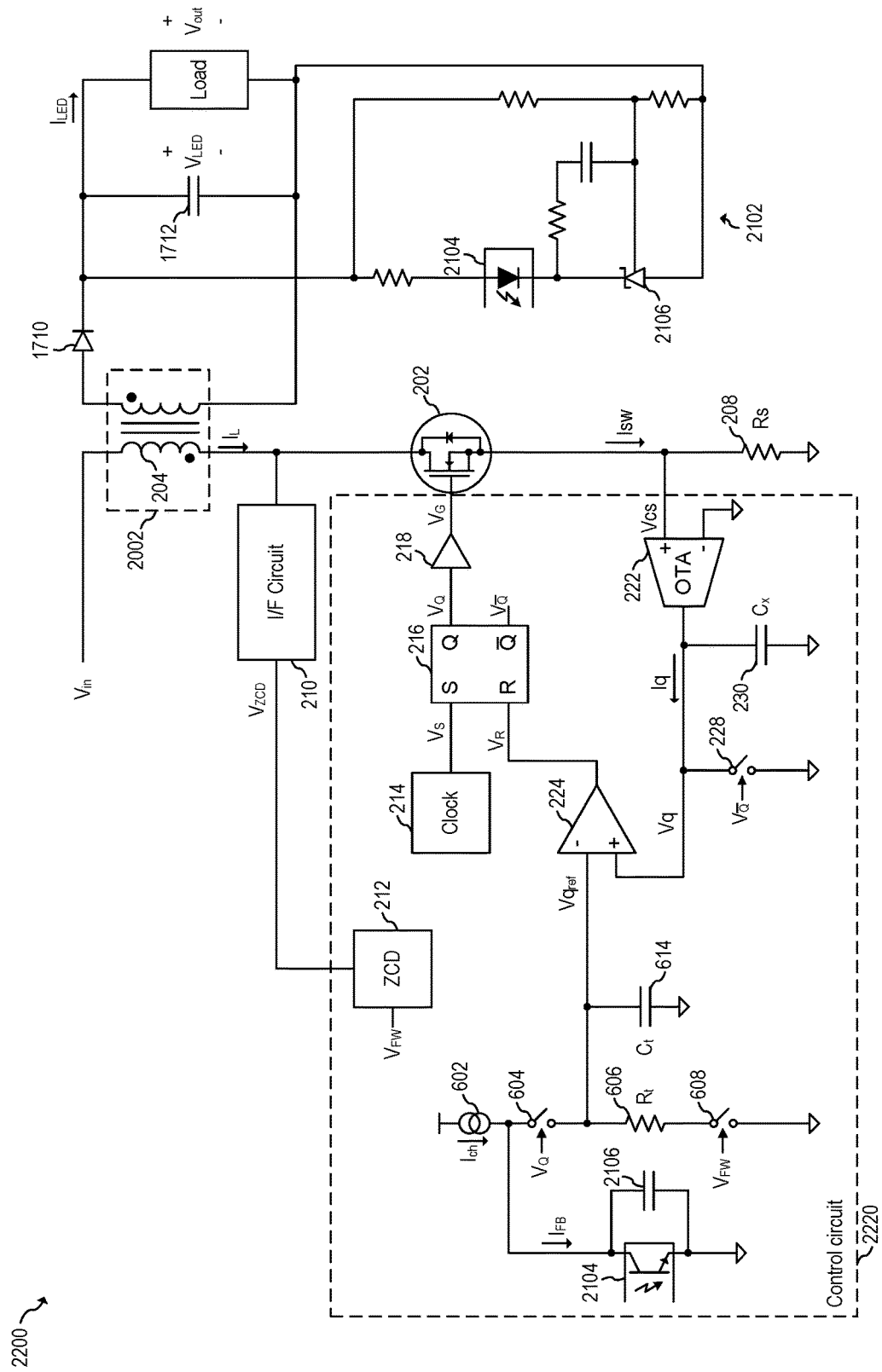

FIG. 22 shows a schematic diagram of isolated CCM/DCM flyback PFC converter 2200, according to an embodiment of the present invention. Flyback converter 2200 includes control circuit 2220, power transistor 202, diode 1710, output capacitor 1712, transformer 2002, interface circuit 210, feedback circuit 2102, and resistor 208. As shown, flyback converter 2200 includes a secondary feedback loop that includes feedback circuit 2102. In some embodiments, flyback converter 2100 regulates output voltage $V_{out}$, where the target voltage of the output voltage $V_{out}$ is set based on the regulation set point of shunt regulator 2106 (the voltage across shunt regulator 2106). In some embodiments, flyback converter 2200 regulates current $I_L$, e.g., for driving a LED string or recharging a battery. In some embodiments, voltage Vi may be voltage $V_{102}$ (e.g., received from converter 102).

As shown in FIG. 22, control circuit 2220 operates in a similar manner as control circuit 2120. Control circuit 2220, however, subtracts current $I_{FB}$ from current $I_{ch}$ instead of modulating current $I_{ch}$ based on multiplying a voltage based on current $I_{FB}$ times rectified AC voltage $V_{1701}$. Thus, in some embodiments, analog dimming may be achieved by changing the set point of current $I_{FB}$.

Figure 23:
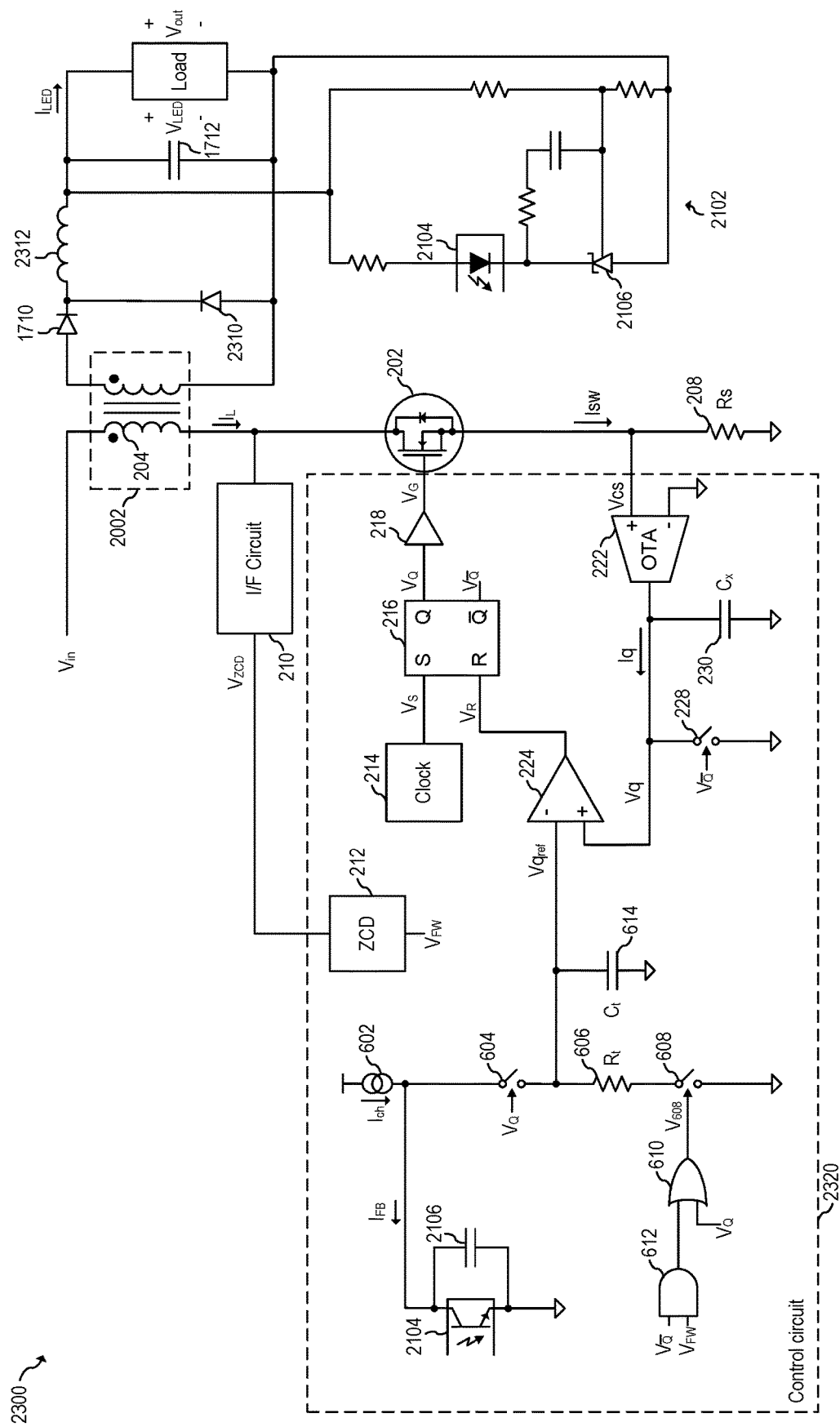

FIG. 23 shows a schematic diagram of isolated forward converter 2300, according to an embodiment of the present invention. Forward converter 2300 includes control circuit 2320, power transistor 202, diodes 1710 and 2312, inductor 2312, output capacitor 1712, transformer 2002, interface circuit 210, feedback circuit 2102, and resistor 208. As shown, forward converter 2300 includes a secondary feedback loop that includes feedback circuit 2102. In some embodiments, forward converter 2300 regulates output voltage $V_{out}$, where the target voltage of the output voltage $V_{out}$ is set based on the regulation set point of shunt regulator 2106. In some embodiments, voltage $V_{in}$ may be voltage $V_{102}$ (e.g., received from converter 102).

As shown in FIG. 23, control circuit 2320 operates in a similar manner as control circuit 2220. Control circuit 2320, however, controls switch 608 with voltage $V_{608}$ instead of using signal $V_{FW}$.

As shows, e.g., in FIGS. 22 and 23, in some embodiments, only the voltage loop (e.g., which includes feedback circuit 2102) is frequency compensated, while the current loop is compensated by averaging capacitor 614.

Advantages of some embodiments include using a single-loop system, in contrast with conventional average current mode control methods that use two nested loops, each requiring frequency compensation. Using a single loop system may advantageously result in a simpler and lower cost implementation.

Additional advantages of some embodiments include more versatility, since some embodiments may control the entire inductor current $I_L$ or only part of it, which may advantageously allow usage of some embodiments for various purposes (e.g., controlling output voltage $V_{LED}$).

Example embodiments of the present invention are summarized here. Other embodiments can also be understood from the entirety of the specification and the claims filed herein.

Example 1. A control circuit including: a driver having an output configured to be coupled to a control terminal of a first transistor; a first flip-flop having a first output coupled to an input of the driver, and a first input configured to receive a clock signal, where the first flip-flop is configured to produce a first signal at the first output of the first flip-flop; a first comparator having an output coupled to a second input of the first flip-flop, a first input configured to receive a first voltage, and a second input configured to receive a second voltage; a transconductance amplifier having a first input configured to receive a sense voltage indicative of a current flowing through a current path of the first transistor, a second input configured to receive a reference voltage, and an output coupled to the first input of the first comparator; a integrating capacitor coupled to the output of the transconductance amplifier and to the first input of the first comparator; a first switch coupled across the integrating capacitor, the first switch having a control terminal configured to receive a second signal, the second signal being an inverted version of the first signal; a zero crossing detection circuit having an input configured to be coupled to a first current path terminal of the first transistor and to an inductor, where the zero crossing detection circuit is configured to detect a demagnetization time of the inductor based on the input of the zero crossing detection circuit, and produce a third signal based on the detected demagnetization time; and a reference generator configured to generate the second voltage based on the first and third signals.

Example 2. The control circuit of example 1, where the reference generator includes: an output terminal configured to deliver the second voltage; an averaging capacitor coupled to the output terminal of the reference generator; a second switch having a first terminal configured to receive a first current, a second terminal coupled to the output terminal of the reference generator, and a control terminal configured to receive the first signal; a third switch having a first terminal coupled to the second terminal of the second switch, and second terminal configured to receive the reference voltage, and a control terminal configured to be driven based on the third signal; and a first resistor coupled between the second terminal of the second switch and the first terminal of the third switch.

Example 3. The control circuit of one of examples 1 or 2, where the control terminal of the third switch is configured to receive the third signal.

Example 4. The control circuit of one of examples 1 to 3, where the reference generator further includes: an OR gate having an output coupled to the control terminal of the third switch, and a first input configured to receive the first signal; and an AND gate having a first input configured to receive the second signal, a second input configured to receive the third signal, and an output coupled to a second input of the OR gate.

Example 5. The control circuit of one of examples 1 to 4, further including a first current generator coupled to the first terminal of the second switch and configured to sink a second current.

Example 6. The control circuit of one of examples 1 to 5, where the transconductance amplifier is configured to inject a first current from the output of the transconductance amplifier into the integrating capacitor the first current being based on the sense voltage, the control circuit further including a first current generator configured to inject a second current into the integrating capacitor.

Example 7. The control circuit of one of examples 1 to 6, where the zero crossing detection circuit including: a first terminal configured to be coupled to the first current path terminal of the first transistor via an interface circuit; a second comparator having a first input coupled to the first terminal, and a second input coupled to the first terminal via a low-pass filter; and a second flip-flop having a first input configured to receive the second signal, a second input coupled to the output of the second comparator; and an output configured to deliver the third signal.

Example 8. The control circuit of one of examples 1 to 7, further including a voltage feedforward circuit including a current mirror configured to inject a first current into the first input of the transconductance amplifier based on a second current flowing through an interface circuit coupled to the first current path terminal of the first transistor and to the inductor.

Example 9. The control circuit of one of examples 1 to 8, where the first input of the first flip-flop corresponds to a set input, and where the second input of the first flip-flop corresponds to a reset input.

Example 10. The control circuit of one of examples 1 to 9, where the first input of the transconductance amplifier is coupled to a first terminal of a sense resistor, the sense resistor having a second terminal configured to receive the reference voltage.

Example 11. The control circuit of one of examples 1 to 10, further including a clock circuit having an output coupled to the first input of the first flip-flop.

Example 12. The control circuit of one of examples 1 to 11, where the clock circuit includes: a second switch having a control terminal configured to receive the second signal, a first terminal configured to receive an oscillator current, and a second terminal; a first resistor coupled to the second terminal of the second switch; a second capacitor coupled to the first resistor; a second comparator having a first input coupled to the second terminal of the second switch, a second input, and an output coupled to the first input of the first flip-flop; a third capacitor coupled to the second input of the second comparator; a first current generator coupled to the third capacitor and to the second input of the second comparator; and a third switch having a first terminal coupled to the first current generator, a second terminal configured to receive the reference voltage, and a control terminal configured to receive the first signal.

Example 13. The control circuit of one of examples 1 to 12, where the clock signal has a fixed frequency.

Example 14. The control circuit of one of examples 1 to 13, where the control circuit is integrated in a single integrated circuit.

Example 15. The control circuit of one of examples 1 to 14, where the driver is a gate driver, and where the first transistor is a power metal-oxide semiconductor field-effect transistor (MOSFET) or GaN transistor having a control terminal coupled to the output of the gate driver.

Example 16. A method including: turning on a first transistor based on a clock signal, where a current path of the first transistor is coupled to an inductor; generating a sense current based on a current flowing through the current path of the first transistor; integrating the sense current with an integrating capacitor to generate a first voltage; injecting a first current into an averaging capacitor to generate a second voltage; turning off the first transistor when the first voltage becomes higher than the second voltage; and discharging the integrating capacitor when the first transistor turns off.

Example 17. The method of example 16, further including generating a sense voltage based on the current flowing through the current path of the first transistor, where generating the sense current includes generating the sense current based on the sense voltage using a transconductance amplifier.

Example 18. The method of one of examples 16 or 17, where injecting the first current into the averaging capacitor includes closing a first switch when the first transistor is turned off, and opening the first switch when the first transistor is turned on.

Example 19. The method of one of examples 16 to 18, further including: detecting a demagnetization time of the inductor; and controlling a second switch based on the detected demagnetization time, the second switch coupled to the first switch via a first resistor.

Example 20. The method of one of examples 16 to 19, further including regulating an average output current flowing through a load that is coupled to the inductor based on the first current.

Example 21. The method of one of examples 16 to 20, where the average output current is proportional to the first current.

Example 22. The method of one of examples 16 to 21, further including regulating an output voltage across a load that is coupled to the inductor based on the first current.

Example 23. A switching converter including: a power transistor; a sense resistor coupled to a current path of the power transistor; an inductor coupled to the current path of the power transistor; a driver having an output coupled to a control terminal of the power transistor; a flip-flop having a first output coupled to an input of the driver, and a first input configured to receive a clock signal, where the flip-flop is configured to produce a first signal at the first output of the flip-flop, and where the flip-flop is configured to cause the power transistor to turn on using the first signal based on the clock signal; a first comparator having an output coupled to a second input of the flip-flop, a first input configured to receive a first voltage, and a second input configured to receive a second voltage, where the flip-flop is configured to cause the power transistor to turn off using the first signal based on the output of the first comparator; a transconductance amplifier having a first input coupled to an intermediate node that is coupled between the current path of the power transistor and the sense resistor, a second input configured to receive a reference voltage, and an output coupled to the first input of the first comparator; an integrating capacitor coupled to the output of the transconductance amplifier and to the first input of the first comparator; a first switch coupled to the integrating capacitor, the first switch configured to discharge the integrating capacitor when the power transistor turns off; a zero crossing detection circuit having an input coupled to the current path of the power transistor and to the inductor, where the zero crossing detection circuit is configured to detect a demagnetization time of the inductor based on the input of the zero crossing detection circuit, and produce a second signal based on the detected demagnetization time; and a reference generator configured to generate the first voltage based on the first and second signals.

Example 24. The switching converter of example 23, further including a transformer that includes a first winding magnetically coupled to a second winding, the first winding being the inductor.

Example 25. The switching converter of one of examples 23 or 24, further including a diode coupled between a first terminal of the inductor and a supply terminal, and a first capacitor coupled between a second terminal of the inductor and the supply terminal.

Example 26. The switching converter of one of examples 23 to 25, further including an auxiliary winding magnetically coupled to the inductor, and a voltage divider coupled between the auxiliary winding and the input of the zero crossing detection circuit.

Example 27. The switching converter of one of examples 23 to 26, further including a first capacitor coupled to the inductor, and a voltage divider coupled between the first capacitor and the input of the zero crossing detection circuit.

Example 28. The switching converter of one of examples 23 to 27, where the switching converter is configured to operate in continuous conduction mode (CCM) or discontinuous conduction mode (DCM) mode based on an average output current flowing through the inductor.

Example 29. A light emitting diode (LED) lamp driver including: an output terminal configured to be coupled to a LED string; a first switching converter configured to receive an AC voltage and generate a DC voltage, at a first supply terminal, from the AC voltage; and a second switching converter configured to receive the DC voltage and deliver a regulated current to the LED string, the second switching converter including: a power transistor, a sense resistor coupled to a current path of the power transistor, an inductor coupled to the current path of the power transistor and to the output terminal, a diode coupled between the inductor and the first supply terminal, a flip-flop having a first output coupled to a control terminal of the power transistor, and a first input configured to receive a clock signal, where the flip-flop is configured to produce a first signal at the first output of the flip-flop, and where the flip-flop is configured to cause the power transistor to turn on using the first signal based on the clock signal, a first comparator having an output coupled to a second input of the flip-flop, a first input configured to receive a first voltage, and a second input configured to receive a second voltage, where the flip-flop is configured to cause the power transistor to turn off using the first signal based on the output of the first comparator, a transconductance amplifier having a first input coupled to an intermediate node that is coupled between the current path of the power transistor and the sense resistor, a second input coupled to a second supply terminal, and an output coupled to the first input of the first comparator; an integrating capacitor coupled to the output of the transconductance amplifier and to the first input of the first comparator, a first switch coupled to the integrating capacitor, the first switch configured to discharge the integrating capacitor when the power transistor turns off, a zero crossing detection circuit having an input coupled to the current path of the power transistor and to the inductor, where the zero crossing detection circuit is configured to detect a demagnetization time of the inductor based on the input of the zero crossing detection circuit, and produce a second signal based on the detected demagnetization time; and a reference generator configured to generate the first voltage based on the first and second signals.

Example 30. The LED lamp driver of example 29, where the first switching converter is a power factor correction (PFC) switching converter.

Example 31. The LED lamp driver of one of examples 29 or 30, where the second supply terminal is coupled to ground.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A control circuit comprising:
    a driver having an output configured to be coupled to a control terminal of a first transistor;
    a first flip-flop having a first output coupled to an input of the driver, and a first input configured to receive a clock signal, wherein the first flip-flop is configured to produce a first signal at the first output of the first flip-flop;
    a first comparator having an output coupled to a second input of the first flip-flop, a first input configured to receive a first voltage, and a second input configured to receive a second voltage;
    a transconductance amplifier having a first input configured to receive a sense voltage indicative of a current flowing through a current path of the first transistor, a second input configured to receive a reference voltage, and an output coupled to the first input of the first comparator;
    a integrating capacitor coupled to the output of the transconductance amplifier and to the first input of the first comparator;
    a first switch coupled across the integrating capacitor, the first switch having a control terminal configured to receive a second signal, the second signal being an inverted version of the first signal;
    a zero crossing detection circuit having an input configured to be coupled to a first current path terminal of the first transistor and to an inductor, wherein the zero crossing detection circuit is configured to detect a demagnetization time of the inductor based on the input of the zero crossing detection circuit, and produce a third signal based on the detected demagnetization time; and
    a reference generator configured to generate the second voltage based on the first and third signals.

2. The control circuit of claim 1, wherein the reference generator comprises:
- an output terminal configured to deliver the second voltage;
- an averaging capacitor coupled to the output terminal of the reference generator;
- a second switch having a first terminal configured to receive a first current, a second terminal coupled to the output terminal of the reference generator, and a control terminal configured to receive the first signal;
- a third switch having a first terminal coupled to the second terminal of the second switch, and second terminal configured to receive the reference voltage, and a control terminal configured to be driven based on the third signal; and
- a first resistor coupled between the second terminal of the second switch and the first terminal of the third switch.

3. The control circuit of claim 2, wherein the control terminal of the third switch is configured to receive the third signal.

4. The control circuit of claim 2, wherein the reference generator further comprises:
- an OR gate having an output coupled to the control terminal of the third switch, and a first input configured to receive the first signal; and
- an AND gate having a first input configured to receive the second signal, a second input configured to receive the third signal, and an output coupled to a second input of the OR gate.

5. The control circuit of claim 2, further comprising a first current generator coupled to the first terminal of the second switch and configured to sink a second current.

6. The control circuit of claim 1, wherein the transconductance amplifier is configured to inject a first current from the output of the transconductance amplifier into the integrating capacitor the first current being based on the sense voltage, the control circuit further comprising a first current generator configured to inject a second current into the integrating capacitor.

7. The control circuit of claim 1, wherein the first input of the transconductance amplifier is coupled to a first terminal of a sense resistor, the sense resistor having a second terminal configured to receive the reference voltage.

8. The control circuit of claim 1, further comprising a clock circuit having an output coupled to the first input of the first flip-flop.

9. The control circuit of claim 1, wherein the clock signal has a fixed frequency.

10. The control circuit of claim 1, wherein the control circuit is integrated in a single integrated circuit.

11. The control circuit of claim 1, wherein the driver is a gate driver, and wherein the first transistor is a power metal-oxide semiconductor field-effect transistor (MOSFET) or GaN transistor having a control terminal coupled to the output of the gate driver.

12. A method comprising:
- turning on a first transistor based on a clock signal, wherein a current path of the first transistor is coupled to an inductor;
- generating a sense current based on a current flowing through the current path of the first transistor;
- integrating the sense current with an integrating capacitor to generate a first voltage;
- injecting a first current into an averaging capacitor to generate a second voltage;
- turning off the first transistor when the first voltage becomes higher than the second voltage; and
- discharging the integrating capacitor when the first transistor turns off.

13. The method of claim 12, further comprising generating a sense voltage based on the current flowing through the current path of the first transistor, wherein generating the sense current comprises generating the sense current based on the sense voltage using a transconductance amplifier.

14. The method of claim 12, wherein injecting the first current into the averaging capacitor comprises closing a first switch when the first transistor is turned off, and opening the first switch when the first transistor is turned on, the method further comprising:
- detecting a demagnetization time of the inductor; and
- controlling a second switch based on the detected demagnetization time, the second switch coupled to the first switch via a first resistor.

15. The method of claim 12, further comprising regulating an average output current flowing through a load that is coupled to the inductor based on the first current.

16. The method of claim 15, wherein the average output current is proportional to the first current.

17. The method of claim 12, further comprising regulating an output voltage across a load that is coupled to the inductor based on the first current.

18. A switching converter comprising:
- a power transistor;
- a sense resistor coupled to a current path of the power transistor;
- an inductor coupled to the current path of the power transistor;
- a driver having an output coupled to a control terminal of the power transistor;
- a flip-flop having a first output coupled to an input of the driver, and a first input configured to receive a clock signal, wherein the flip-flop is configured to produce a first signal at the first output of the flip-flop, and wherein the flip-flop is configured to cause the power transistor to turn on using the first signal based on the clock signal;
- a first comparator having an output coupled to a second input of the flip-flop, a first input configured to receive a first voltage, and a second input configured to receive a second voltage, wherein the flip-flop is configured to cause the power transistor to turn off using the first signal based on the output of the first comparator;
- a transconductance amplifier having a first input coupled to an intermediate node that is coupled between the current path of the power transistor and the sense resistor, a second input configured to receive a reference voltage, and an output coupled to the first input of the first comparator;
- an integrating capacitor coupled to the output of the transconductance amplifier and to the first input of the first comparator;
- a first switch coupled to the integrating capacitor, the first switch configured to discharge the integrating capacitor when the power transistor turns off;
- a zero crossing detection circuit having an input coupled to the current path of the power transistor and to the inductor, wherein the zero crossing detection circuit is configured to detect a demagnetization time of the inductor based on the input of the zero crossing detection circuit, and produce a second signal based on the detected demagnetization time; and
- a reference generator configured to generate the first voltage based on the first and second signals.

19. The switching converter of claim 18, further comprising: a transformer that comprises a first winding magnetically coupled to a second winding, the first winding being the inductor.

20. The switching converter of claim 18, further comprising a diode coupled between a first terminal of the inductor and a supply terminal, and a first capacitor coupled between a second terminal of the inductor and the supply terminal.

21. The switching converter of claim 18, further comprising an auxiliary winding magnetically coupled to the inductor, and a voltage divider coupled between the auxiliary winding and the input of the zero crossing detection circuit.

22. The switching converter of claim 18, further comprising a first capacitor coupled to the inductor, and a voltage divider coupled between the first capacitor and the input of the zero crossing detection circuit.

23. The switching converter of claim 18, wherein the switching converter is configured to operate in continuous conduction mode (CCM) or discontinuous conduction mode (DCM) mode based on an average output current flowing through the inductor.

24. A light emitting diode (LED) lamp driver comprising:
an output terminal configured to be coupled to a LED string;
a first switching converter configured to receive an AC voltage and generate a DC voltage, at a first supply terminal, from the AC voltage; and
a second switching converter configured to receive the DC voltage and deliver a regulated current to the LED string, the second switching converter comprising:
a power transistor,
a sense resistor coupled to a current path of the power transistor,
an inductor coupled to the current path of the power transistor and to the output terminal,
a diode coupled between the inductor and the first supply terminal,
a flip-flop having a first output coupled to a control terminal of the power transistor, and a first input configured to receive a clock signal, wherein the flip-flop is configured to produce a first signal at the first output of the flip-flop, and wherein the flip-flop is configured to cause the power transistor to turn on using the first signal based on the clock signal,
a first comparator having an output coupled to a second input of the flip-flop, a first input configured to receive a first voltage, and a second input configured to receive a second voltage, wherein the flip-flop is configured to cause the power transistor to turn off using the first signal based on the output of the first comparator,
a transconductance amplifier having a first input coupled to an intermediate node that is coupled between the current path of the power transistor and the sense resistor, a second input coupled to a second supply terminal, and an output coupled to the first input of the first comparator;
an integrating capacitor coupled to the output of the transconductance amplifier and to the first input of the first comparator,
a first switch coupled to the integrating capacitor, the first switch configured to discharge the integrating capacitor when the power transistor turns off,
a zero crossing detection circuit having an input coupled to the current path of the power transistor and to the inductor, wherein the zero crossing detection circuit is configured to detect a demagnetization time of the inductor based on the input of the zero crossing detection circuit, and produce a second signal based on the detected demagnetization time; and
a reference generator configured to generate the first voltage based on the first and second signals.

25. The LED lamp driver of claim 24, wherein the first switching converter is a power factor correction (PFC) switching converter.

* * * * *